(12) United States Patent
Smith et al.

(10) Patent No.: US 11,619,324 B2
(45) Date of Patent: Apr. 4, 2023

(54) STRUCTURAL FASTENER

(71) Applicant: Mag Daddy LLC, Cary, IL (US)

(72) Inventors: Michael Walter Smith, Palatine, IL (US); Daniel James Dickinson, Lincolnshire, IL (US)

(73) Assignee: MAG DADDY, LLC, Wauconda, IL (US)

( * ) Notice: Subject to any disclaimer, the term of this patent is extended or adjusted under 35 U.S.C. 154(b) by 0 days.

(21) Appl. No.: 16/876,046

(22) Filed: May 16, 2020

(65) Prior Publication Data
US 2020/0347962 A1 Nov. 5, 2020

Related U.S. Application Data

(63) Continuation-in-part of application No. 16/597,060, filed on Oct. 9, 2019, which is a continuation-in-part of application No. 15/998,605, filed on Aug. 20, 2018, now Pat. No. 11,261,897.

(51) Int. Cl.
*F16L 3/22* (2006.01)
*F16L 3/04* (2006.01)
*H02G 3/32* (2006.01)

(52) U.S. Cl.
CPC ............. *F16L 3/04* (2013.01); *F16L 3/221* (2013.01); *H02G 3/32* (2013.01)

(58) Field of Classification Search
CPC ... F16L 3/227; F16L 3/24; F16L 3/243; F16B 37/043; F16B 7/0473; F16B 37/045; F16B 7/187; F24S 2025/804
See application file for complete search history.

(56) References Cited

U.S. PATENT DOCUMENTS

| | | | | |
|---|---|---|---|---|
| 2,918,240 A * | 12/1959 | Wiegand | ................. | F16L 3/227 248/71 |
| 3,346,863 A * | 10/1967 | Siebold | .................... | H01Q 7/00 343/702 |
| 3,532,311 A * | 10/1970 | Havener | ................. | F16L 3/227 248/62 |
| 4,783,040 A * | 11/1988 | Lindberg | ................ | F16L 3/243 248/74.3 |
| 5,149,026 A * | 9/1992 | Allen | ...................... | F16L 3/227 248/68.1 |
| 5,919,019 A * | 7/1999 | Fischer | ................. | F16B 37/043 411/182 |
| 6,257,530 B1 * | 7/2001 | Tsai | ........................ | F16L 3/127 248/73 |
| 6,354,543 B1 * | 3/2002 | Paske | ....................... | H01P 1/00 248/68.1 |

(Continued)

*Primary Examiner* — Bradley Duckworth

(57) ABSTRACT

A U-shaped band to attach or snap a conduit or pipe to a slotted structural member. The U-shaped band includes a bottom portion, a first side having a first arm connected to the bottom portion; a second side having a second arm connected to the bottom portion thereby forming a U-shaped structure with the first and second sides. The at least one arm snaps into a slot of the slotted structural member when in an engaged position. The slotted structural member may be a strut or a receiver. The receiver has arms to engage and snap into curled ends or lips on sides of the strut and thus may adapt the band to the strut. Alternatively, the band may snap into suitably sized slots on the slotted structural member.

21 Claims, 32 Drawing Sheets

(56) References Cited

U.S. PATENT DOCUMENTS

| | | | | |
|---|---|---|---|---|
| 6,976,292 B2* | 12/2005 | MacPherson | ........... | B60N 3/026 |
| | | | | 24/292 |
| 7,090,174 B2* | 8/2006 | Korczak | ............... | F16B 37/045 |
| | | | | 248/61 |
| 7,226,260 B2* | 6/2007 | Jackson, Jr. | ........... | F16B 21/076 |
| | | | | 411/112 |
| 8,439,316 B2* | 5/2013 | Feige | ......................... | F16L 3/10 |
| | | | | 248/71 |
| 8,590,223 B2* | 11/2013 | Kilgore | ................... | H02S 20/24 |
| | | | | 52/173.3 |
| 8,714,495 B2* | 5/2014 | Myers | .................... | F16L 3/1211 |
| | | | | 248/74.1 |
| 8,800,120 B2* | 8/2014 | Benedetti | .............. | F16B 5/0642 |
| | | | | 24/458 |
| 8,844,888 B1* | 9/2014 | Gretz | .................... | F16L 3/2431 |
| | | | | 248/231.81 |
| 9,331,629 B2* | 5/2016 | Cheung | .................... | H02S 20/23 |
| 9,562,554 B2* | 2/2017 | Vidal | ...................... | F16B 37/02 |
| 9,574,589 B2* | 2/2017 | Knutson | ................. | F16L 3/243 |
| 9,879,803 B2* | 1/2018 | Leng | ........................ | H02G 3/32 |
| 2002/0100146 A1* | 8/2002 | Ko | .......................... | F16B 37/02 |
| | | | | 24/295 |
| 2005/0236861 A1* | 10/2005 | Slobodecki | ............ | F16B 37/043 |
| | | | | 296/39.1 |
| 2011/0084179 A1* | 4/2011 | Wiedner | ................... | F16L 3/12 |
| | | | | 248/67.7 |
| 2011/0163562 A1* | 7/2011 | Smith | ................. | F16B 37/0842 |
| | | | | 296/1.07 |
| 2018/0245716 A1* | 8/2018 | Nijdam | ................ | H02G 3/0456 |
| 2018/0335072 A1* | 11/2018 | Wilson | ................. | F16B 37/043 |
| 2018/0347614 A1* | 12/2018 | Reznar | ................. | F16B 37/046 |
| 2020/0347962 A1* | 11/2020 | Smith | ..................... | F16L 3/227 |

* cited by examiner

STRUCTURAL FASTENER

RELATED APPLICATIONS

This application is a continuation in part application of U.S. patent application Ser. No. 16/597,060 entitled "Structural Fastener" filed on Oct. 9, 2019, which is a continuation in part application of U.S. patent application Ser. No. 15/998,605 entitled "Structural Fastener" filed on Aug. 20, 2018, which is a continuation in part application of U.S. patent application Ser. No. 14/147,522 entitled "Spring fastener" filed on Jan. 4, 2014, which is a continuation in part application of U.S. patent application Ser. No. 13/476,957 entitled "Spring fastener with highly improved lever/angle pulling force" filed on May 21, 2012, which is a continuation in part of U.S. patent application Ser. No. 11/564,840 entitled "Spring fastener with highly improved lever/angle pulling force" filed on Nov. 29, 2006, which is a continuation in part of U.S. Pat. No. 7,188,392 entitled "Spring fastener with highly improved lever/angle pulling force", filed on Sep. 16, 2004, which claims priority from provisional application 60/520,807 filed on Nov. 17, 2003 and owned by the instant assignee.

All of the referenced applications and patents are incorporated by reference.

FIELD OF THE INVENTION

The invention relates generally to devices for fastening objects, and more particularly to a fastener and strut hangers to secure construction components or to attach onto an engagement structure, such as a chassis, a strut, a hollow substrate, a wall, a plate or any suitable surface.

BACKGROUND OF THE INVENTION

A number of devices and fasteners are currently available to secure cables or for fastening pipes, conduit and cables to a building structure. Similarly, threaded rods, struts, panels, body panels, building structure, and electrical conduit are fastened to the chassis or frame of a building. For example, spring nuts and other devices are used to secure bolts and threaded rods to a strut or truss. Clamps and cable ties are used to secure cables in electrical wiring and boxes. As used herein, a strut refers to a u-shaped bracket having holes to allow for attachment at various points and to facilitate a variety of construction situations. The chassis of the building may include any substrate, plate, roof or ceiling support, structural framework, chassis component or subcomponent, support component, wall or any suitable object or combination.

Attaching wires or cables to a building structure, electrical box or body panel typically requires conventional securing threaded rods, bolts, wires, cable clamps, electrical boxes, screw in cable clamps, straps, tape or clips already fastened to a wire assembly. These conventional devices require two hands to manipulate and install and require time to screw a bolt or nut. If the installed device is not in the desired position or level, then the installer must loosen the screw or bolt and then re-align the device and retighten, thus extending the installation time even further. At least some of the conventional fasteners require extended height or blind insertion and installation of the fasteners because the installer is not able to view the fastener or the mounting point on the body panel. These conventional fasteners require fastening with a screwdriver or wrench and thus are cumbersome and difficult to install, especially in inaccessible areas. Nor can they be installed without a screwdriver or wrench for example on an electrical box, conduit or in automobile environments that can be somewhat harsh. Further, replacement of an installed, broken nut, rod or strut requires removal and can again be difficult.

DETAILED DESCRIPTION OF THE PREFERRED EMBODIMENTS

Figure 1:
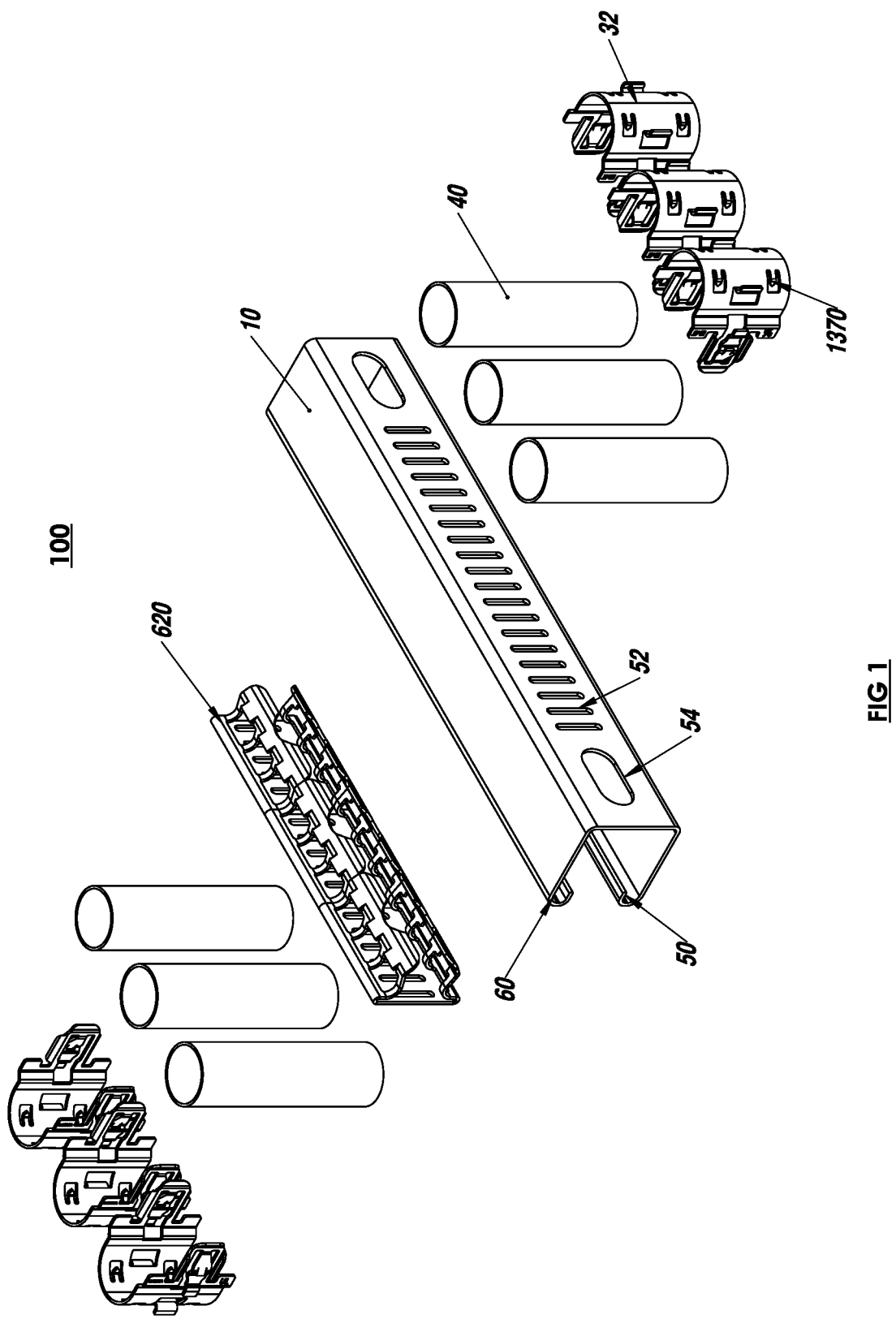
FIG. 1 is an exploded view of a slotted structural member assembly with multiple cages and a strut member operable to attach to a conduit or pipe according to one embodiment.

A U-shaped band to attach or snap a conduit or pipe to a slotted structural member. The U-shaped band includes a bottom portion, a first side having a first arm connected to the bottom portion; a second side having a second arm connected to the bottom portion thereby forming a U-shaped structure with the first and second sides. The at least one arm snaps into a slot of the slotted structural member when in an engaged position. The slotted structural member may be a strut or a receiver. The receiver has arms to engage and snap into curled ends or lips on sides of the strut and thus may adapt the band to the strut. Alternatively, the band may snap into suitably sized slots on the slotted structural member.

According to one embodiment, one or both arms of the band may snap into slot in either the strut or the receiver.

According to one embodiment, wings on each of the ends of the cage engage corresponding slots on the receiver to stabilize and retain the cage on the receiver. The strut receiver has an engagement region on the wings. The engagement regions may engage an edge of a channel rib.

The receiver and the cage are comprised of at least one of: zinc die cast, machine steel, cast plastic or powdered metal, cindered (pressing powder together), plastic, vinyl, rubber, plastisol, plastic, acetal, polyacetal, polyoxymethylene, nylon, fiberglass and carbon fiber.

During installation, the receiver may be easily snapped into the strut and the band may be easily and quickly snapped into the receiver thus quickly attaching the pipe to the strut. This reduces the amount of time to attach pipes, conduit electrical wires or any suitable construction materials to a building structure.

The band and receiver permits relatively easy insertion of the strut into a building chassis, pillar, structure, door, roof or suitable panel while providing a relatively high level of strength and support. Assembly of the band onto the receiver is very easy and requires no or a relatively low level of installation effort and as a result provides many ergonomic advantages. The receiver and band eliminates the need for threading a clamp or nut on a long threaded rod, and thus significantly reduces the clamp nut—threaded rod assembly. Also, the installer can snap the receiver and band with one hand whereas the prior art conventional nuts require two hands to hold the clamp or nut and the structural construction member.

The relatively easy attachment is particularly advantageous for operators who repetitively install pipes, conduit electrical wires or any suitable construction materials onto the building chassis. The relatively easy installation required for inserting the receiver and band into the building chassis may result in fewer injuries to the assembly workers, including injuries related to repetitive stress syndrome. Further by selecting a receiver and band or reducing the number of different receiver and band for different strut lengths and thicknesses, confusion during assembly is eliminated since the same type or a reduced number of fasteners may be used for all or most struts. Thus, an electrician, installer, or assembly worker need not worry about selecting the wrong fastener.

The relatively high level of strength, characteristic of the receiver and band, securely attaches to the building or chassis. Further, the receiver and band quickly and easily adjusts to the structural member and minimizes long tedious threading of nuts and clamps, flexing of the fastener and structural members, pushing by operators, vibration and thermal expansion. For example, since conventional top and bottom nuts between the strut are required to clamp the strut, changes in length of the strut or rod requires untightening and tightening of the nuts. In contrast, the receiver is removed from the strut slot may be easily inserted into the desired position on the structural member. The receiver and band may also fasten to plastic and/or metal engagement structures. The receiver and band nut may be made of anti-corrosive material such as plastic or treated metal to provide long reliable service life.

Yet another advantage is that the receiver and band is relatively easy to manufacture using relatively inexpensive manufacturing processes and materials. The use of the receiver and band decreases installation effort and time, assembly and production costs, increases worker productivity and efficiency, improves reliability and quality and decreases overall assembly, warranty and maintenance costs. The receiver and band improves reliability both in the short term and in the long term, while further improving safety and quality.

FIGS. 1-6 are exploded views of a strut receiver assembly 100, 200, 400 providing springing attachment to a slotted structural member 10 such as a structural member commonly known as a "strut." Strut receiver assembly 100 includes a strut receiver 20, 620, 620, and a band or cage 32 operable to detachably couple a pipe 40.

FIGS. 1-5 are examples of 1, 2, 3, 4 or more bands or cages 32 snapping into one or more struts 10 or receiver 20, 620, 620. FIGS. 2-6 show a strut receiver 20, 620, 620 in an engaged position with a band or cage 32 and strut member 10 operable to attach to a pipe 40 according to another embodiment. The strut receiver 20, 620, 620 is in an engaged position with multiple bands or cages 32 and a strut member 10 operable to attach to multiple pipes 40 according to another embodiment. Multiple bands or cages 32 are shown snapped to the strut receiver 20, 620 in an engaged position with a strut member 10 operable to attach to multiple pipes 40 according to another embodiment. Bands or cages 32 and receivers 20, 620 may span multiple struts 10 and conversely multiple struts 10 may span a receiver 20, 620 and thus the cages 32 and receivers 20 are extremely flexible building blocks capable of supporting multiple pipes.

Figure 15:
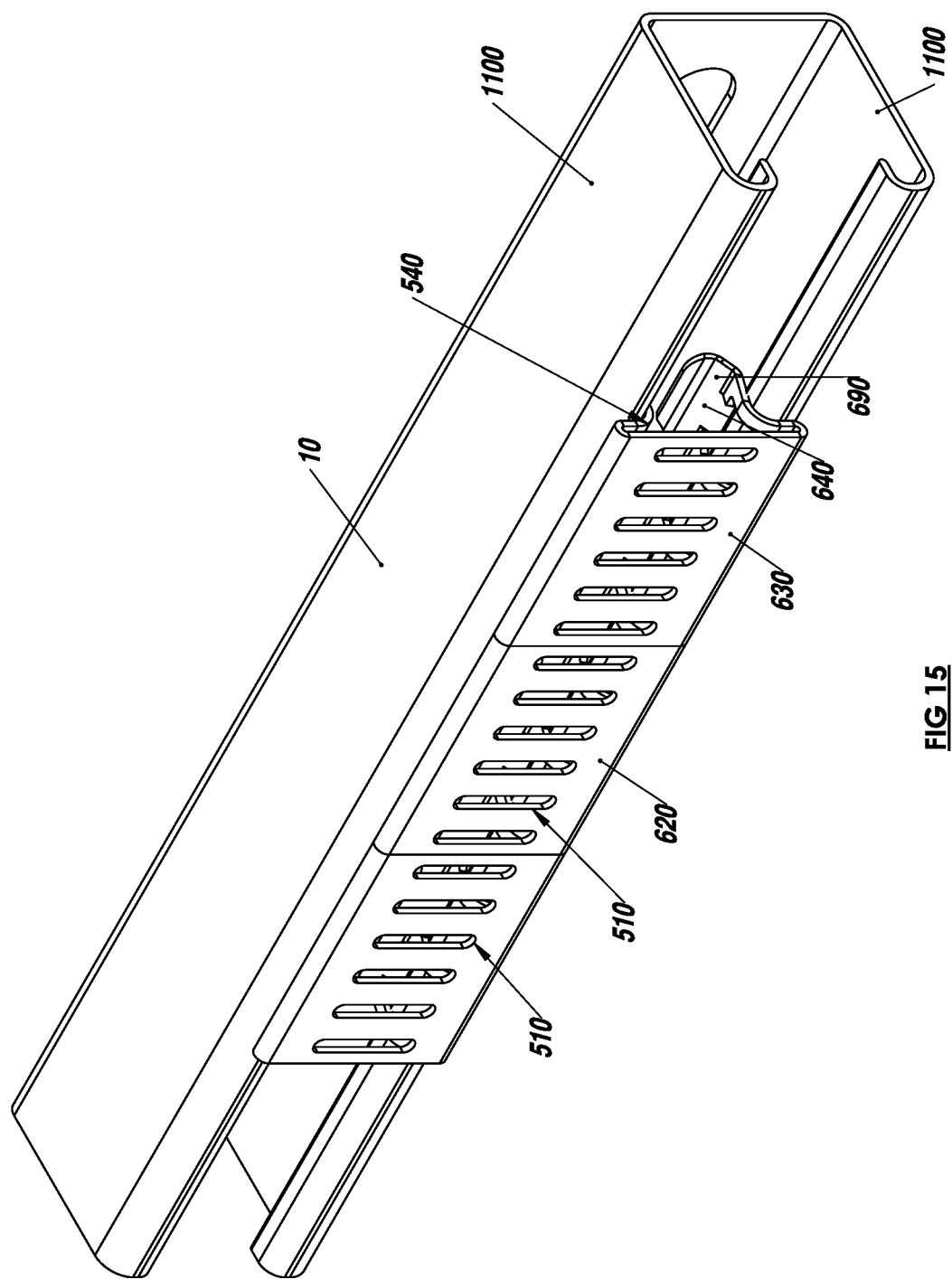
FIG. 15 is a perspective view of multiple strut receivers in an engaged position with a strut member.
Figure 16:
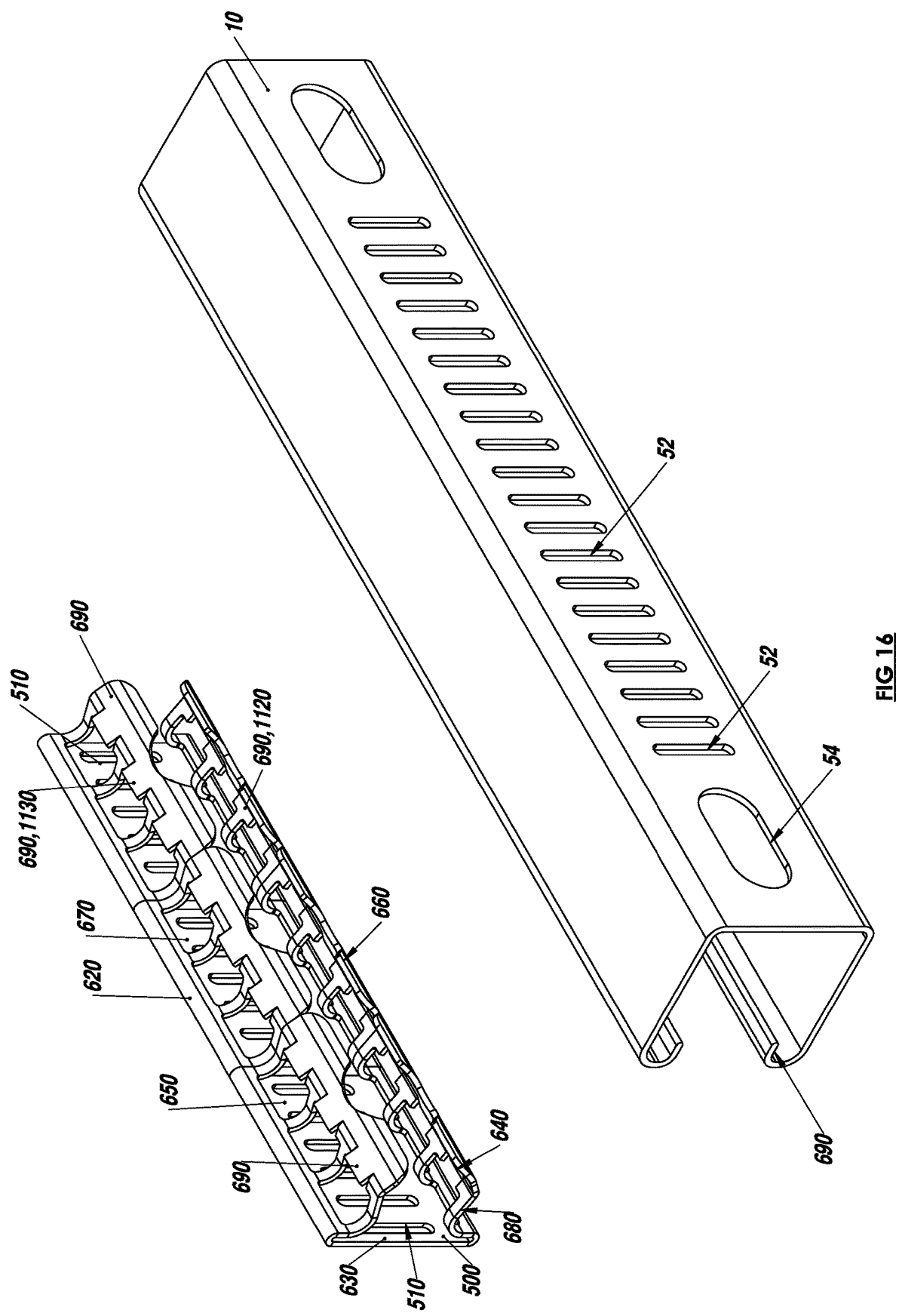
FIG. 16 is an exploded view of a slotted structural member assembly according to an embodiment.

FIGS. 15-16 illustrate the strut receiver 620 and a strut 10. Strut receiver 620 includes a bottom portion 630 having a plurality of slots 510, a first side 640 connected to the bottom portion 630 and a second side 650 connected to the bottom portion 630, thereby forming a U-shaped structure with the first 640 and second sides 650. The sides 640, 650 have optional corresponding plurality of first engagement springs each have outward facing wings 660, 670.

Figure 17:
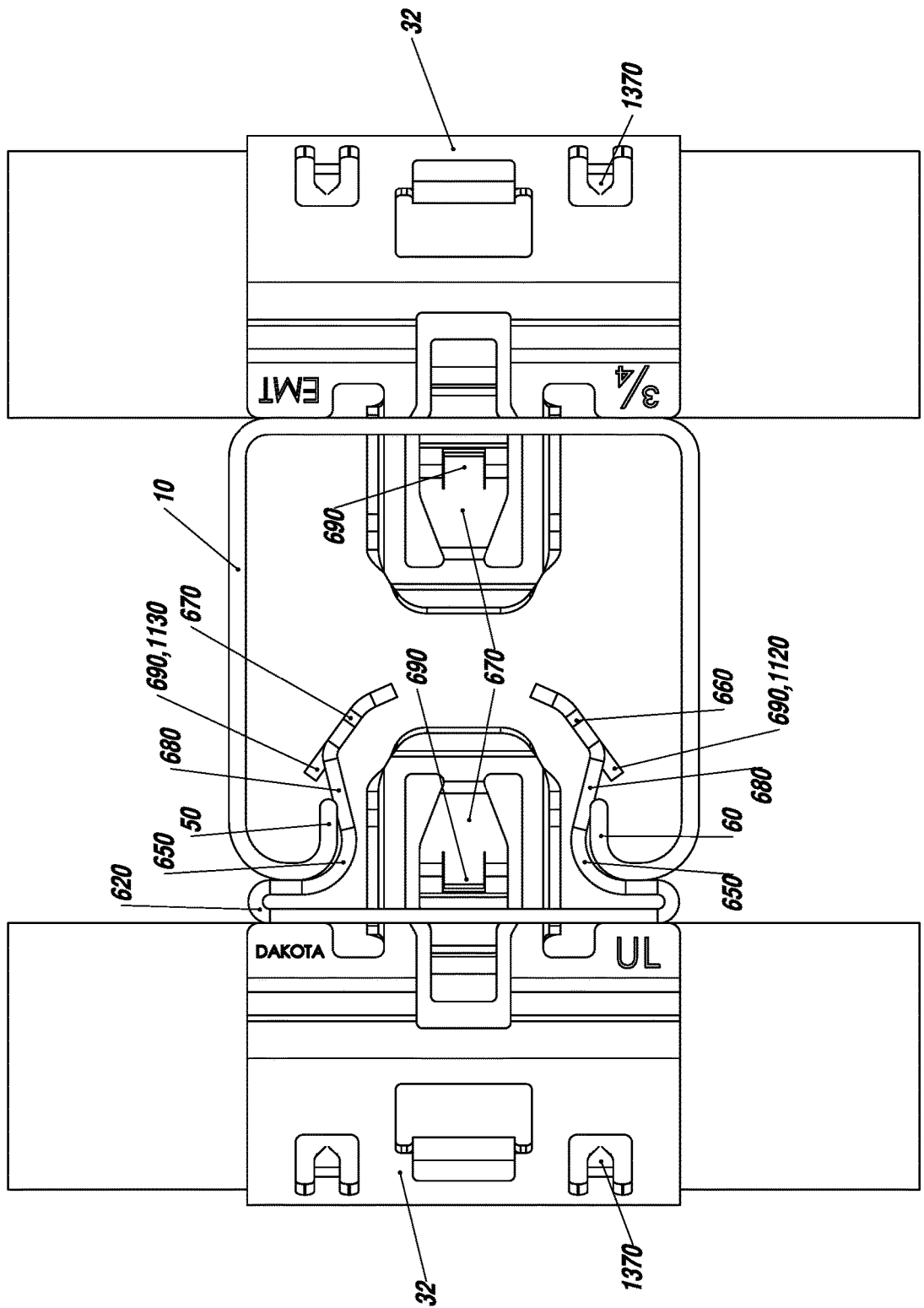
FIG. 17 is an open side view of a slotted structural member, receiver and cage assembly according to an embodiment.

FIG. 16 shows a strut receiver 620 according to another embodiment. As shown in FIG. 17 the wings 660 include sheer tabs 690 to snap into a rim 50, 60 and wherein the arms 680 engage a rim 50, 60 edge when in an engage position. The rim 50, 60 has a curled lip at an end opposite the bottom portion 630.

Outward facing wings 660 on the first side 640 are operable for springing attachment to a first rim 50 on the slotted structural member 10. The outward facing wing 670 on the second side 650 are operable for springing attachment to a second rim 60 on the slotted structural member 10. In other words, the wings 660, 670 are operable for springing attachment to rim 50, 60 of the inside channel walls 1100, 1110 of the slotted structural member 10. As shown in FIG. 17 the height of the arms and wings 660, 670 are chosen according to the wall height of the strut 10 so wings 660, 670 have enough clearance when opposing bands or cages 32 are snapped in. For example, a cage or band 32 is snapped into a receiver 620, the receiver 620 is snapped into a strut 10 and another cage or band 32 is snapped into the strut 10. Thus the height of the strut 10 sets a maximum height of the cage or band 32 and wings 660, 670. Thus if the height of the wall is further reduced then the height of the wings 660, 670 may be reduced accordingly.

According to one embodiment, the wings 660, 670 further comprise a hook 690, 1120, 1130 at an open end of the wing 660, 670 extending into an inside rim or lip 50, 60 on the structural member 10. For example, upon insertion the hook 690, 1120, 1130 snaps over and partially around the rim 50, 60 in order to hook and thus impede removal of the receiver 620 from the slotted structural member 10. A removal tool such as a screwdriver may be used to pry or bend hooks 690, 1120, 1130 away from rim 50, 60 or towards each other to facilitate removal.

According to one embodiment, first side engagement region 660 includes a depression and the second side engagement region 670 is a depression not shown but is described in U.S. Pat. No. 7,188,392 hereby incorporated by reference.

Figure 20:
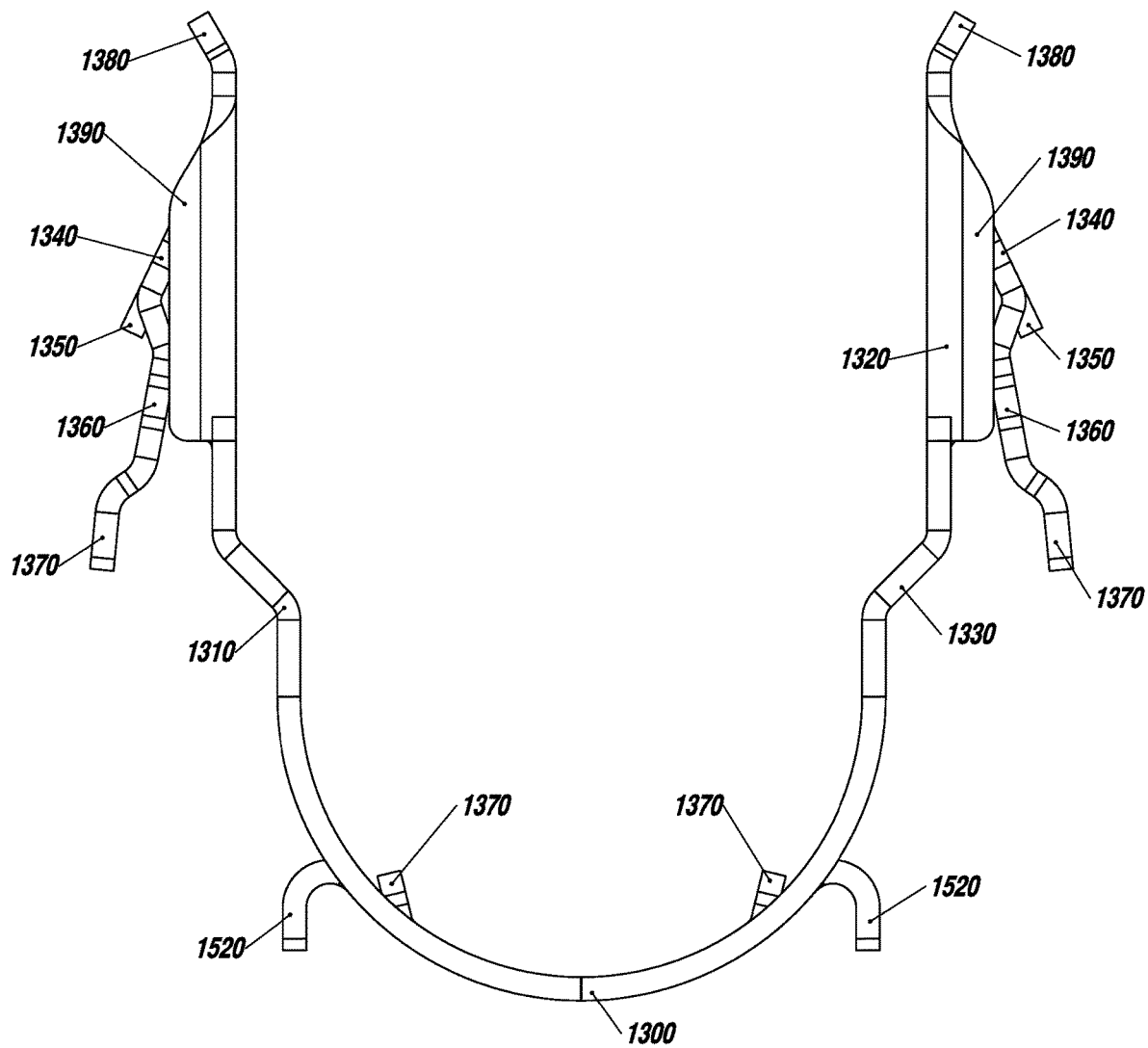
FIG. 20 is an end side view of a cage according to an embodiment.
Figure 21:
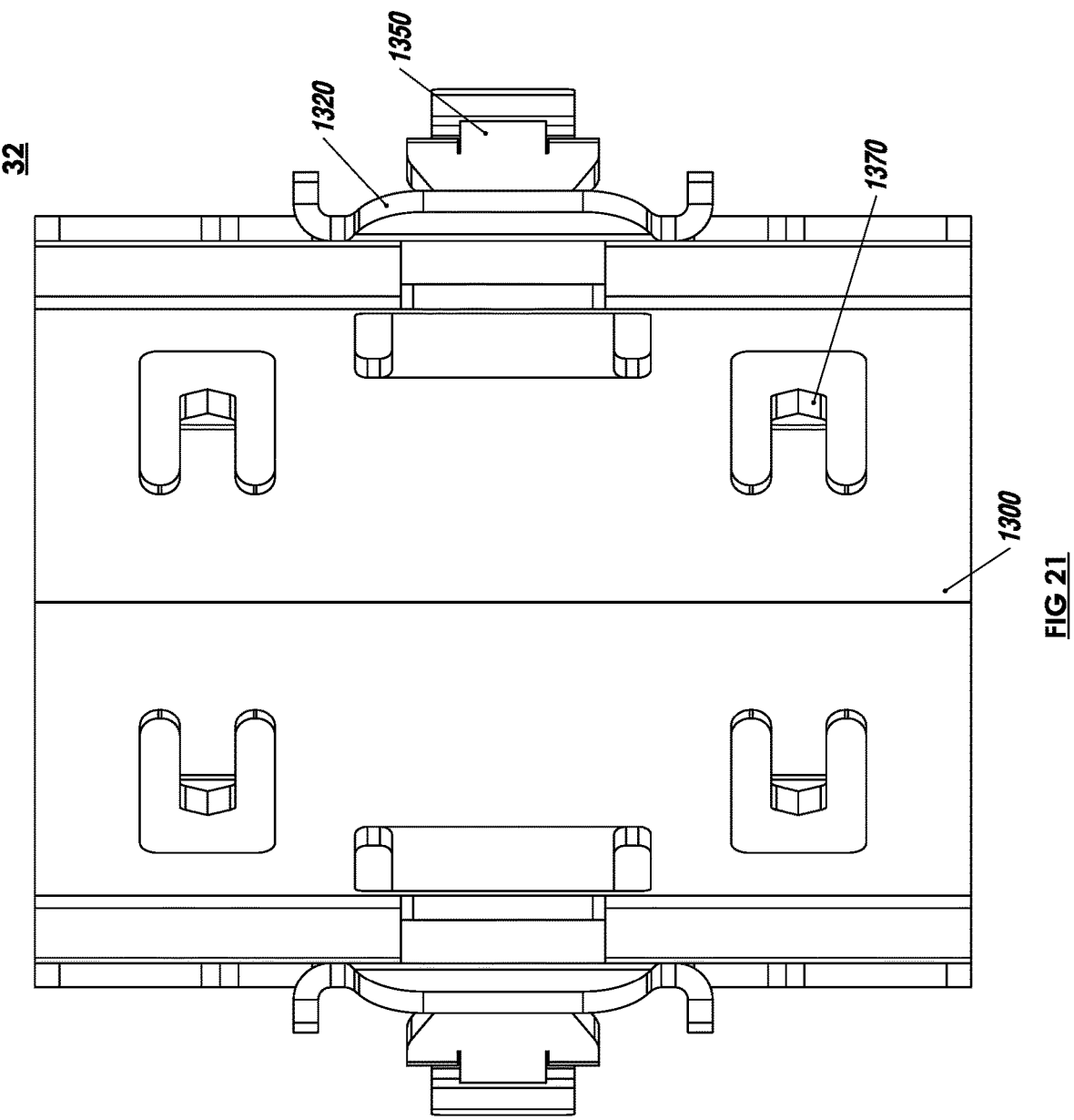
FIG. 21 is a top view of a cage according to another embodiment.

FIGS. 12, 13, 17-21 illustrate a band 32. FIG. 20 shows a band 32 having a bottom portion 1300 a first side 1310 having a first arm 1320 for engaging a first receiver slot 510 and a second side 1330 having a second arm 1320', for optionally engaging a second receiver slot 510'. The arms 1320, 1320' form a u-shape such that from the horizontal portion of the U-shaped portion extends the arms 1320, 1320'. Wing 1340, extending from the arms 1320. The bottom portion 1300 has a shape selected from at least one of: a semicircular, oval, or conic, or any suitable shape.

The first arm 1320 further comprises at least one first engagement region and the second arm 1320' further comprises at least one second engagement region.

The wings 1340 further comprise a servicing tab 1365 on each wing for removably retaining the band into the first and second slots. The wings 1340 on the at least one arm 1320, 1320' to snap into the slot 510. The wings 1340 engage the strut or receiver slots 510 with a knuckle 1350 at an open end of the wing 1340 extending into an inside lip on the structural member. The knuckle 1350 pushes the wing 1340 inward during insertion into the slot 510. According to one embodiment, the knuckle 1350 further comprises a depression on each knuckle 1350 to "catch" an edge of slot 510 thus providing for low insertion force and a relatively high extraction force when engaging the receiver slots 510. As the knuckle 1350 pinnacle passes through the slot 510, the knuckle 1350 snaps out until the cradle 1360 portion of the wing 1340 rests on the inside of slot 510 during an engaged position.

According to one embodiment, the wing 1340 has a tapered width to allow the wing 1340 to return when snapped into the slot 510. The width may be selected such that sufficient metal or material provides sufficient springing constant or return force when snapped into slot 510.

The band bottom 1300 portion further comprises a plurality of tensioner prongs or "barbs" 1370 to engage a conduit or pipe 40 when the band 32 is in an engaged position with the receiver 20, 620. Barbs 1370 will touch a surface of the conduit 40 during engagement such that the barbs 1370 will flex, and maintain pressure to prevent conduit 40 from sliding back and forth. Also barbs 1370 take up tolerance between the band 32 and the conduit 40, so there may be a suitable resulting gap between conduit 40 and the band 32. Thus a design choice for a range of different diameter conduit 40 could fit within a band 32. Different shapes of pipe, such as square, oval, triangular or any suitable shape of pipe 40 are contemplated. As the band 32 is inserted during engagement, pipe 40 is pushed and depending on the relative diameter will cause square band 32 to bend according to the conduit outer surface, for example into a rounded shape and in combination bends with the springing action of barbs 1620, takes a set. For example, bending may occur beyond yield point on the modulus of elasticity of the metal in band 32 and changes the shape and the spring rate. The mentioned factors may be selected or designed so the pipe 40 does not become loose. According to one embodiment, the prongs 1370 accommodate different pipe sizes such as pipe 40. For example, the curved and/or sharp point 1370 digs into pipe 40 body.

Each arm 1320, 1340 on the band has a tapered tip 1380 at the end of wing 1340. Each arm 1320, 1340, on the band 32 has a curved tip 1380 at the end of the wing 1340. Curved tip 1380 is sufficiently curved so that as inserted the wings 1340 open as necessary and ease insertion. During heat treatment, the curved portion may shrink causing the diameter to decrease and thus the curved tips' tapered tip 1380 allow easy insertion of the tips tapered tip 1380 into the slots.

FIGS. 17-21 also illustrate a flange 1390 on band 32. Due to the bend in flange 1390 to form a sort of tapered corner, the bent flange 1390 fills slot 52, 510, 510' hole, such as the width of the hole, where the width is just below width of slot 52, 510, 510'. The flange 1390 prevents rocking and rotation of the band 32.

Tapered tip 1380, 1680 functions as a lead in and allows the wing 1340, 1840 to locate the band 30 in the slot 510. Tapered tip 1380, 168 makes insertion into the slot 510 easier, than during insertion, the edge of the wing 1820 engages the slot 510, and snaps over the slot 510.

Figure 18:
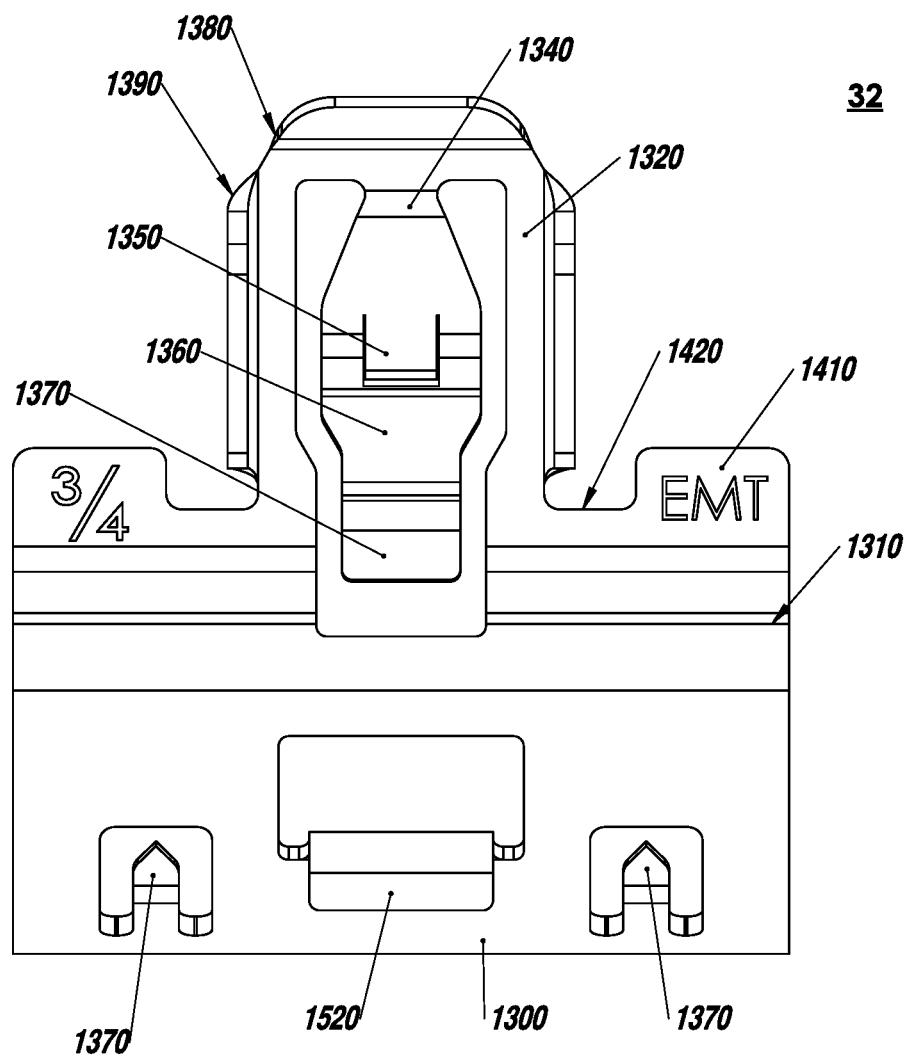
FIG. 18 is a side view of a cage according to an embodiment.
Figure 19:
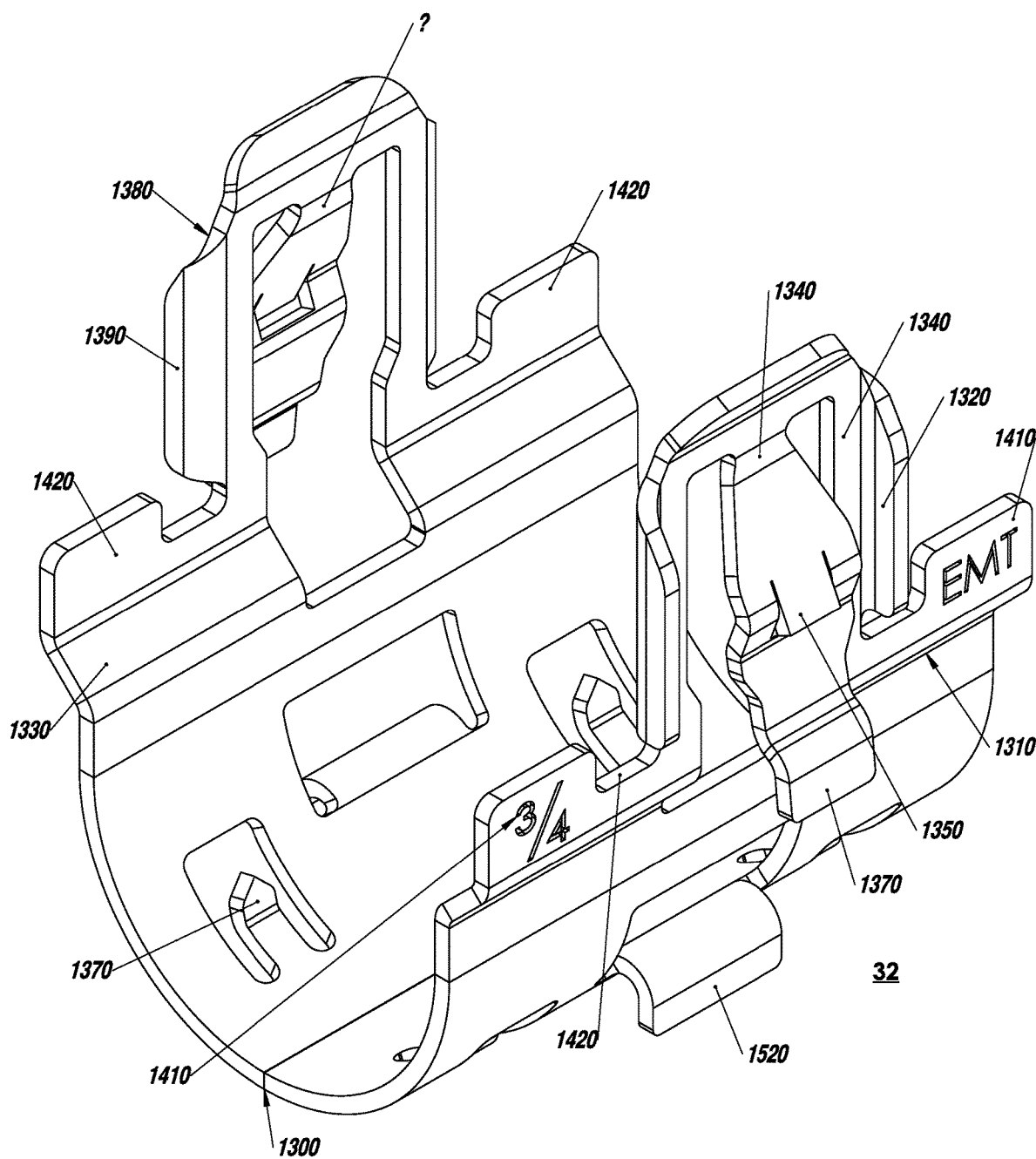
FIG. 19 is a perspective view of a cage according to an embodiment.

FIG. 18 illustrates on each arm 1320, 1340 on the band 32 has an optional shoulder stop 1410. Shoulder stop 1410 creates a hard stop during insertion. Gap 1420 between flanges 1390 and shoulder 1410 is material or the lack of material needed to suitably bend to form angle in flange 1390. Wall shoulder 1410 is thus vertical to make shoulder 1410 strong. Within the receiver 20, 620 in between slots 52, 510, 510' holding wing knuckle tab 1370 needs to be strong and thick enough to hold clip band 32.

The band 32 may further include at least one insertion driver prong, tab 1520 on the bottom portion 1300 to assist in snapping the at least one arm 1320 into the slot 52, 510. Insertion may be by a palm push. Alternatively a screw driver pushed down on insertion tab 1520 creates a force down the arm 1320, 1340 so screw driver pushes down, on each side one at a time, to cause wing 1340 to snap and engage. Pushing with ones palm may cause wings 1340 to go off center. Pushing with screw driver directs force downwards, with ergonomic handle.

Figure 10:
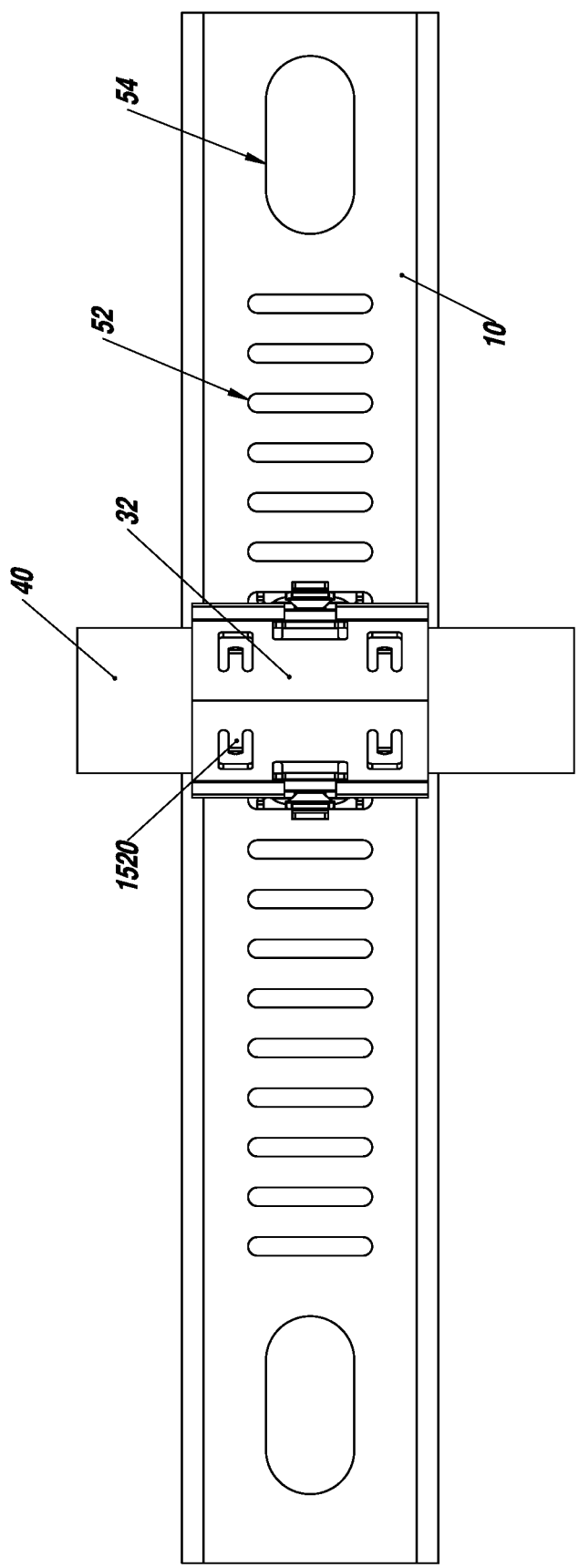
FIG. 10 is a top view of a slotted structural member according to another embodiment.
Figure 11:
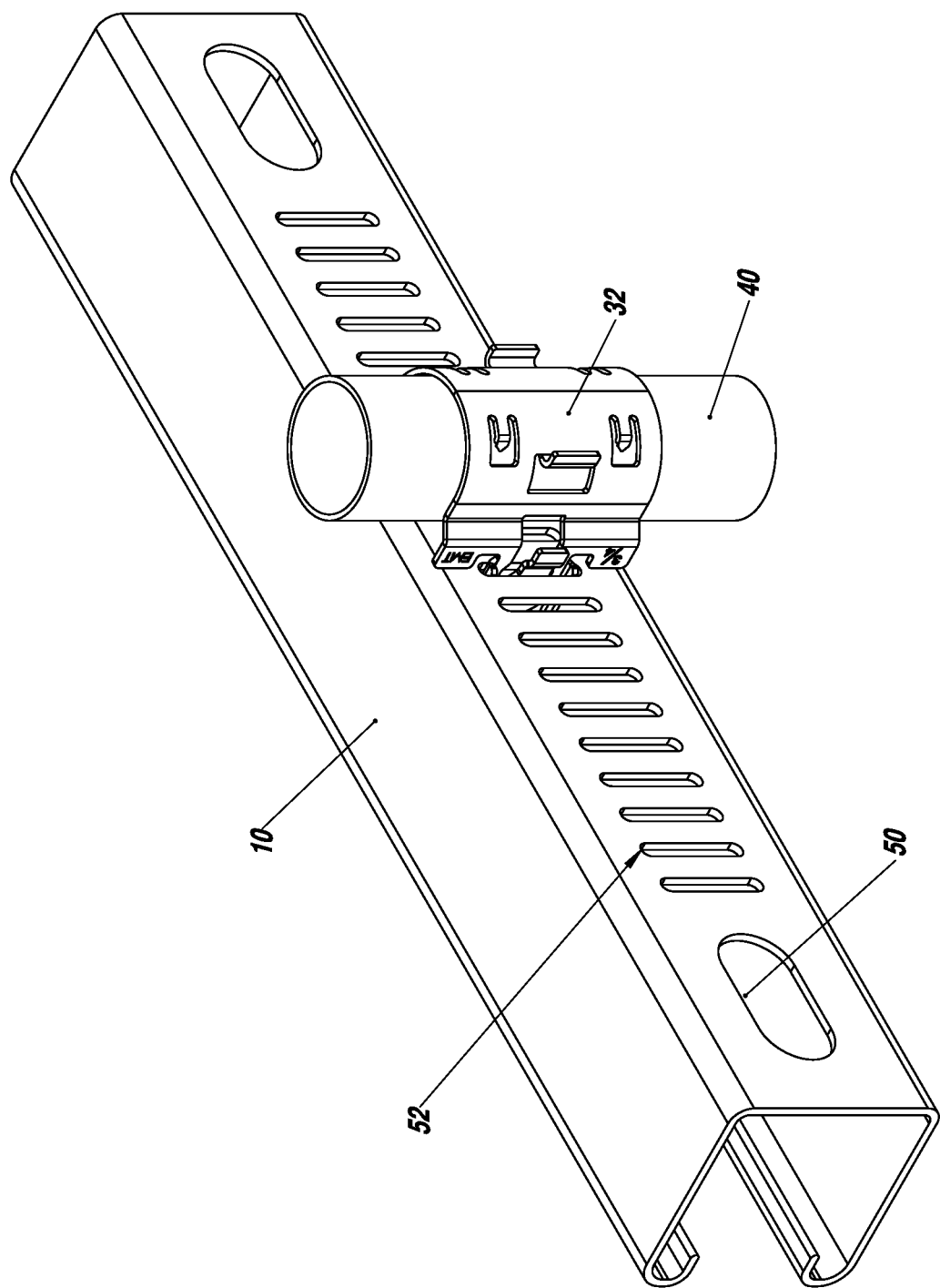
FIG. 11 is a perspective view of a slotted structural member in an engaged position with a band according to one embodiment.
Figure 12:
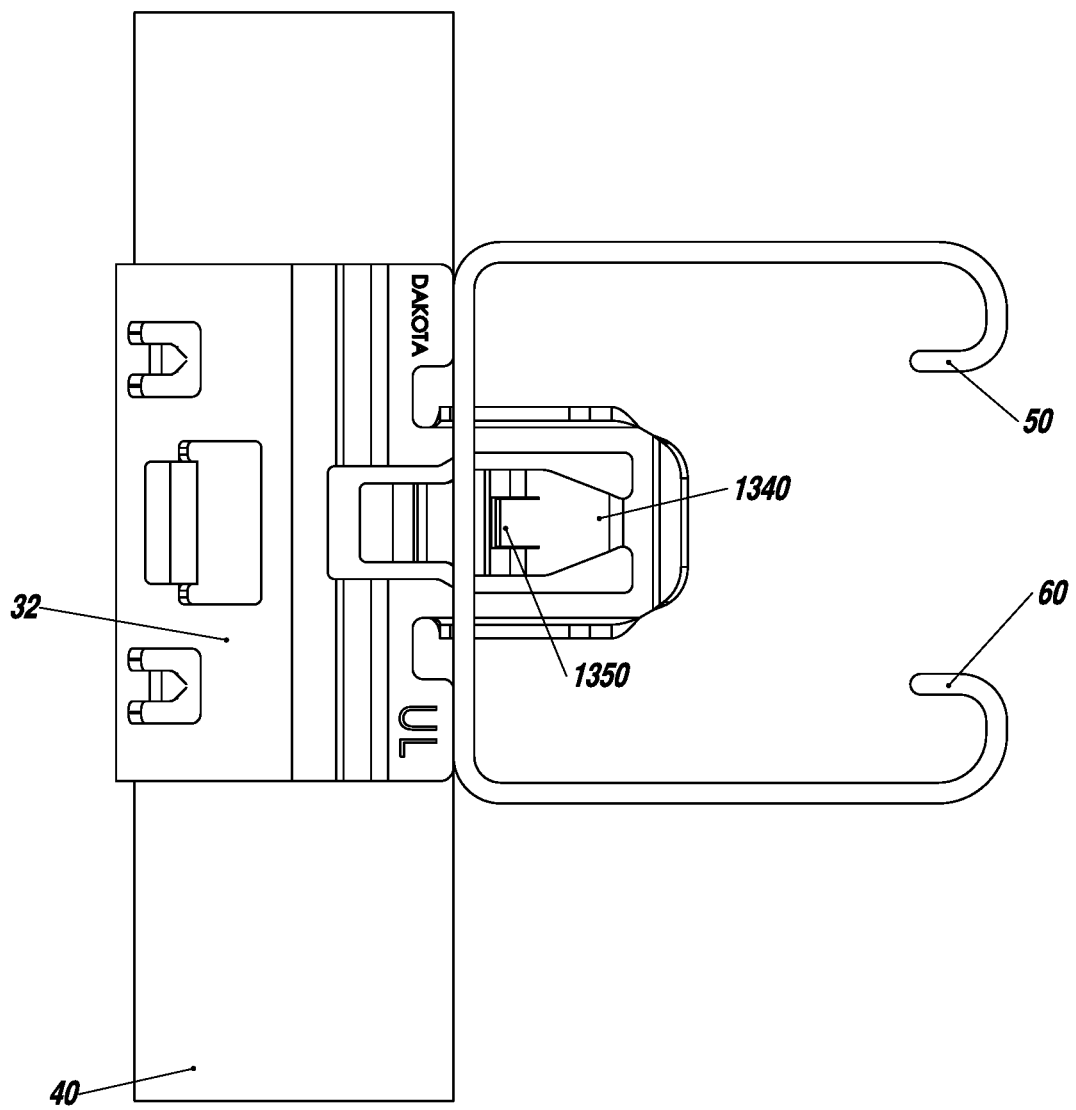
FIG. 12 is an open end view of a slotted structural member in an engaged position with a band according to another embodiment.
Figure 13:
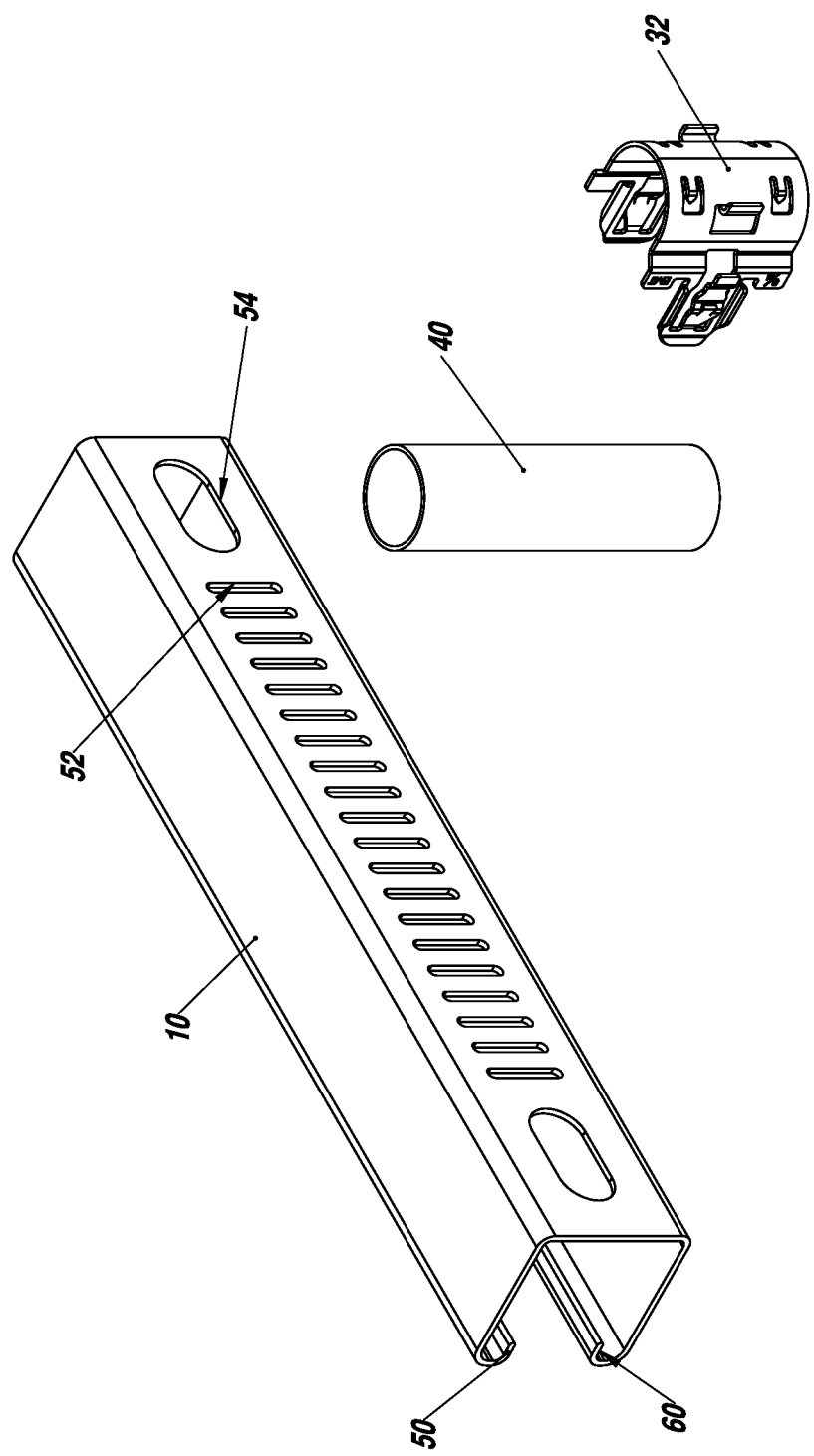
FIG. 13 is an exploded view of a slotted structural member, cage and conduit according to one embodiment.
Figure 14:
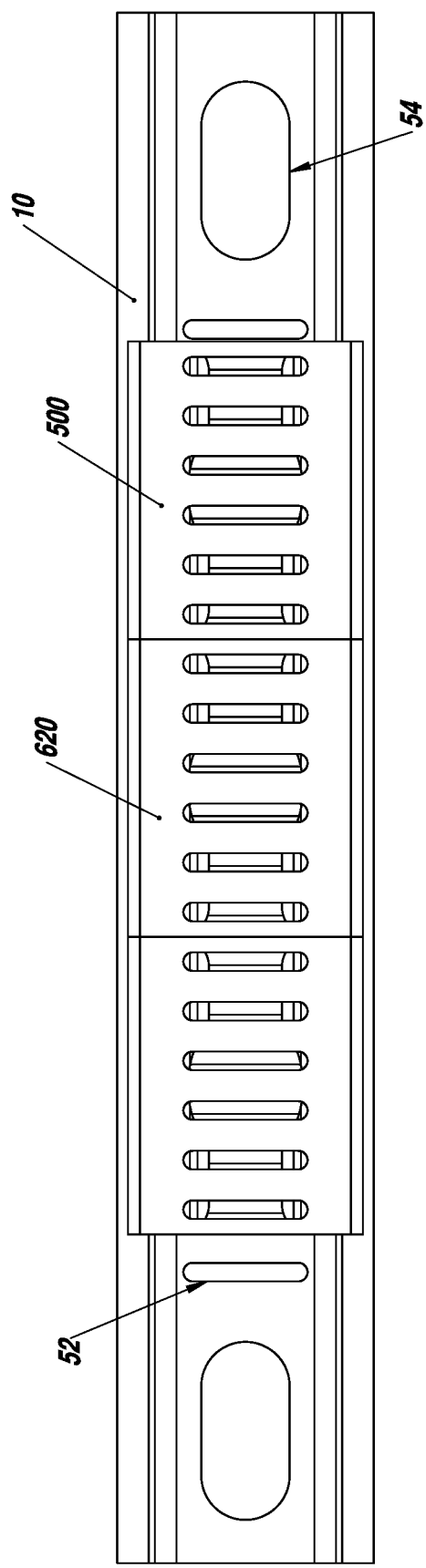
FIG. 14 is a top view of multiple strut receivers in an engaged position with a strut member according to another embodiment.

FIGS. 10, 11 illustrate one embodiment of the band 32 according to another embodiment. FIGS. 11, 12 are perspective views of a band 32 in an engaged position with the strut member operable to attach to a pipe 40 according to another embodiment. During the engaged position, the knuckle 1350 on band 32 hooks an upper surface and an edge of slot 510 to provide a high level of extraction force to restrict wing 1340 from withdrawing from slot 510.

Figure 2:
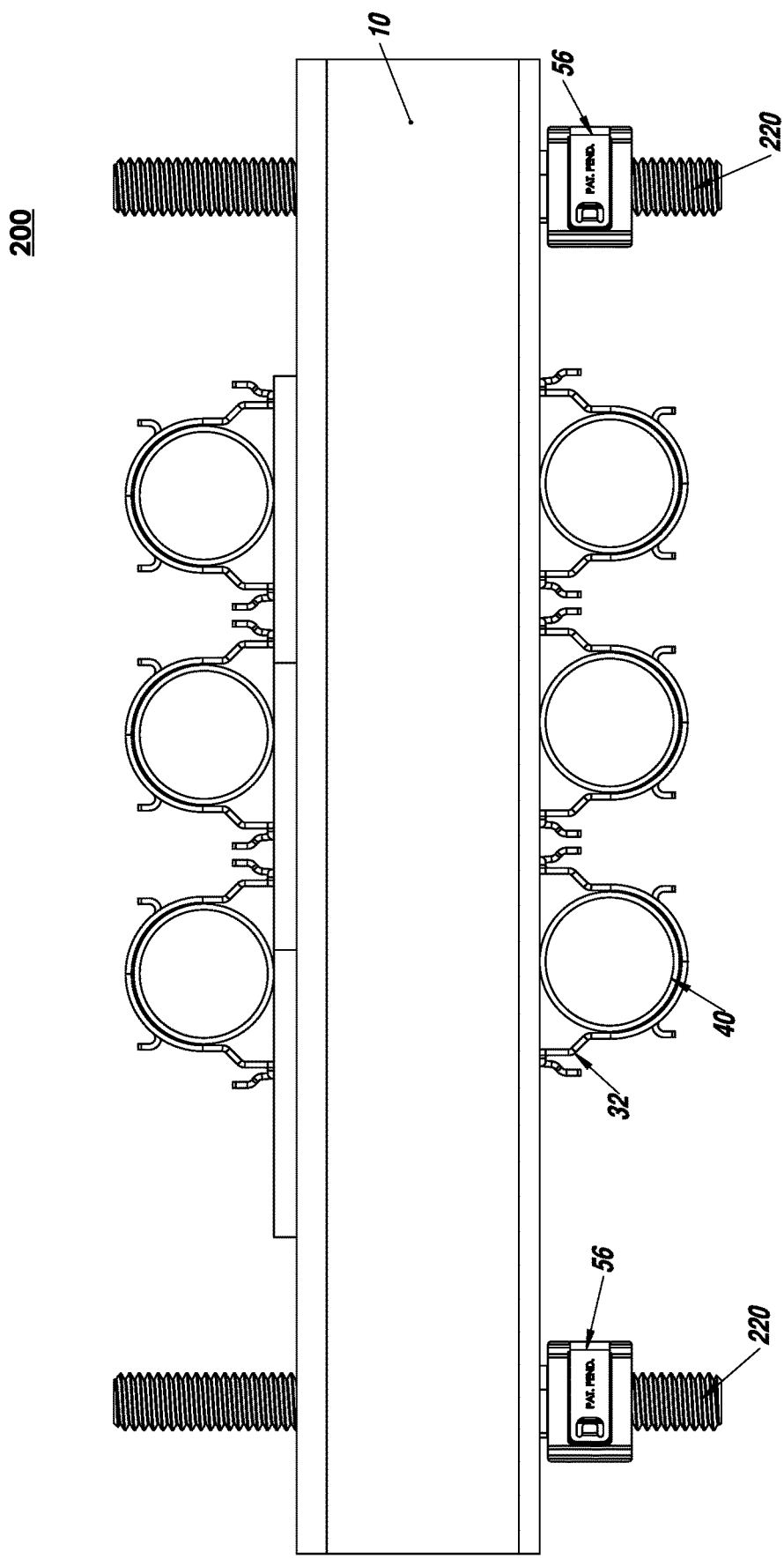
FIG. 2 is a view of a slotted structural member assembly with multiple cages and a strut member according to another embodiment.
Figure 3:
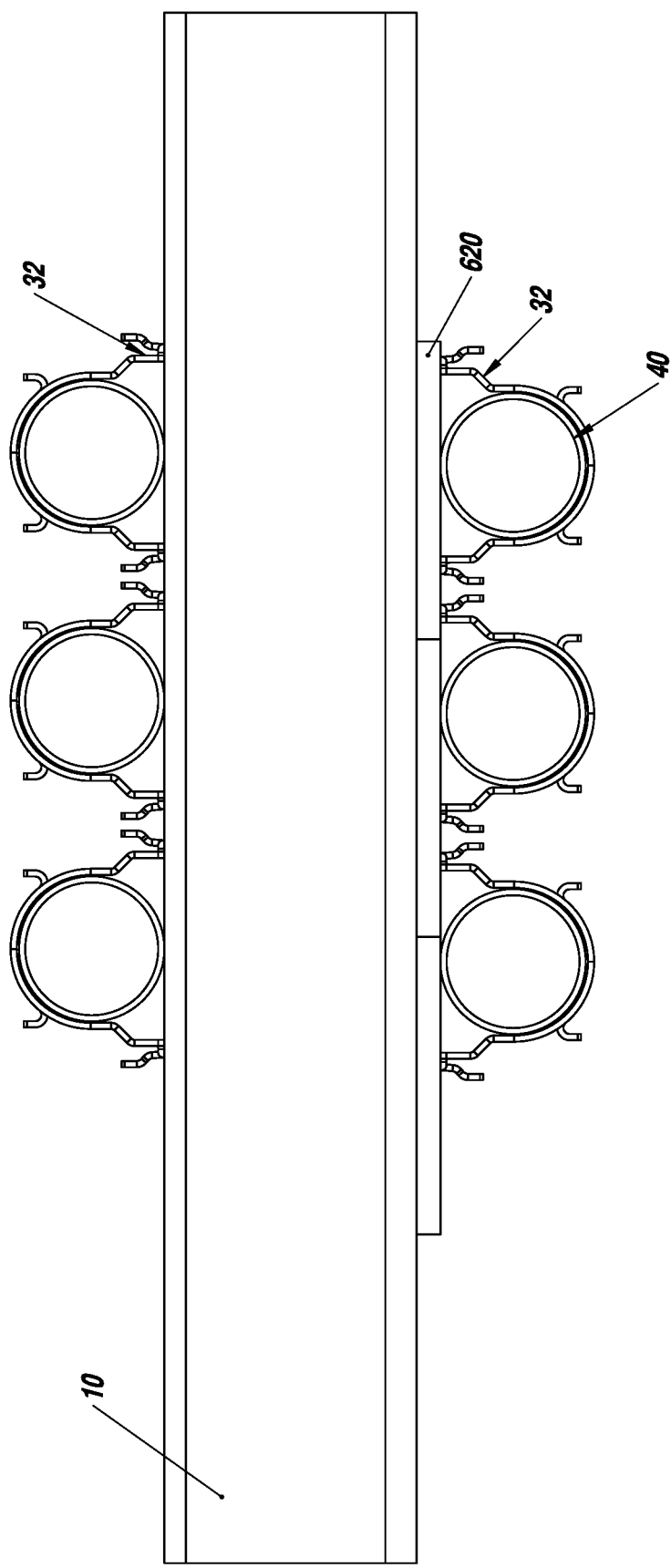
FIG. 3 is a side view of a slotted structural member assembly with multiple cages and a strut member according to one embodiment.
Figure 4:
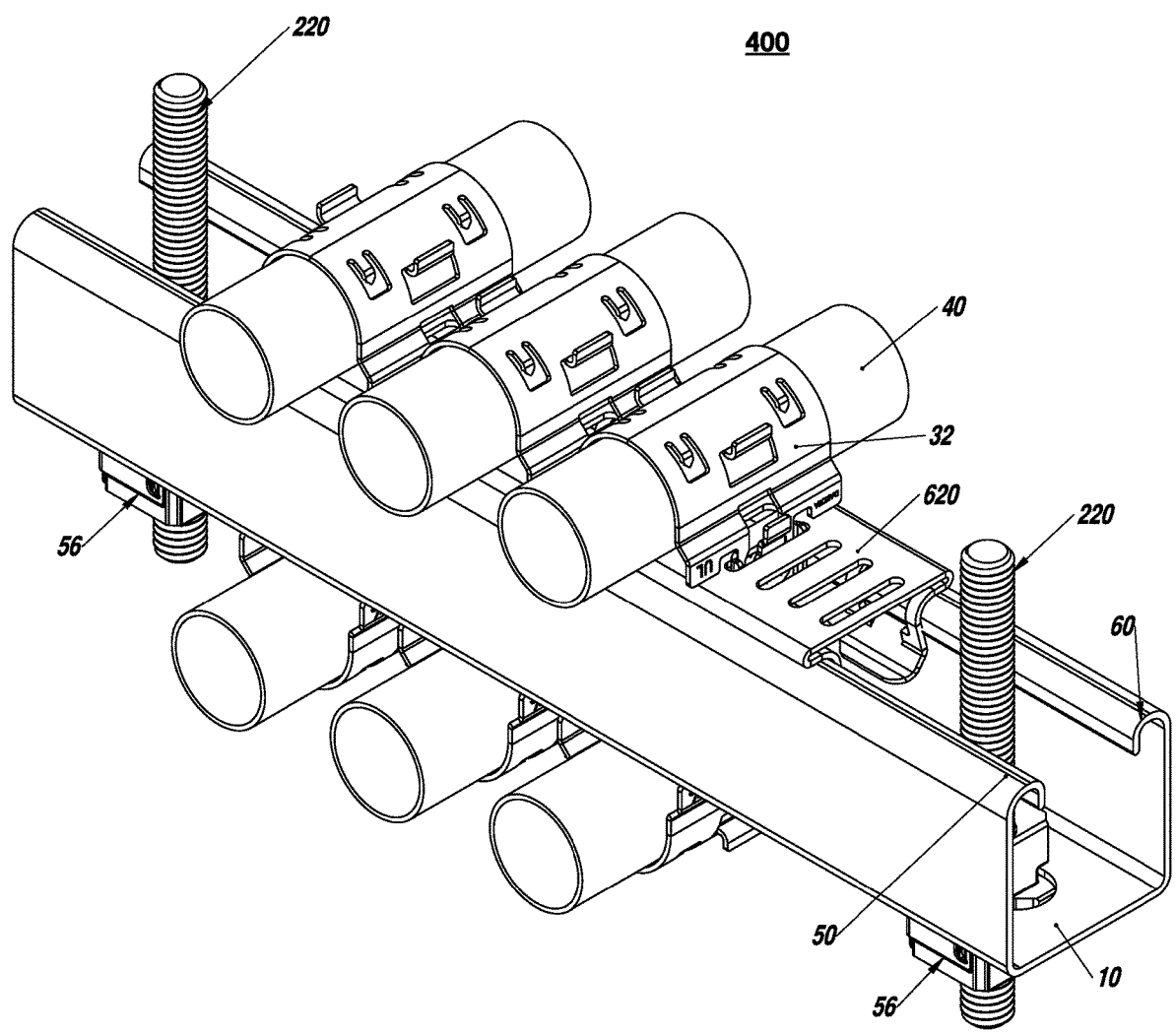
FIG. 4 is a perspective view of a slotted structural member with multiple cages and a strut member assembly according to one embodiment.
Figure 5:
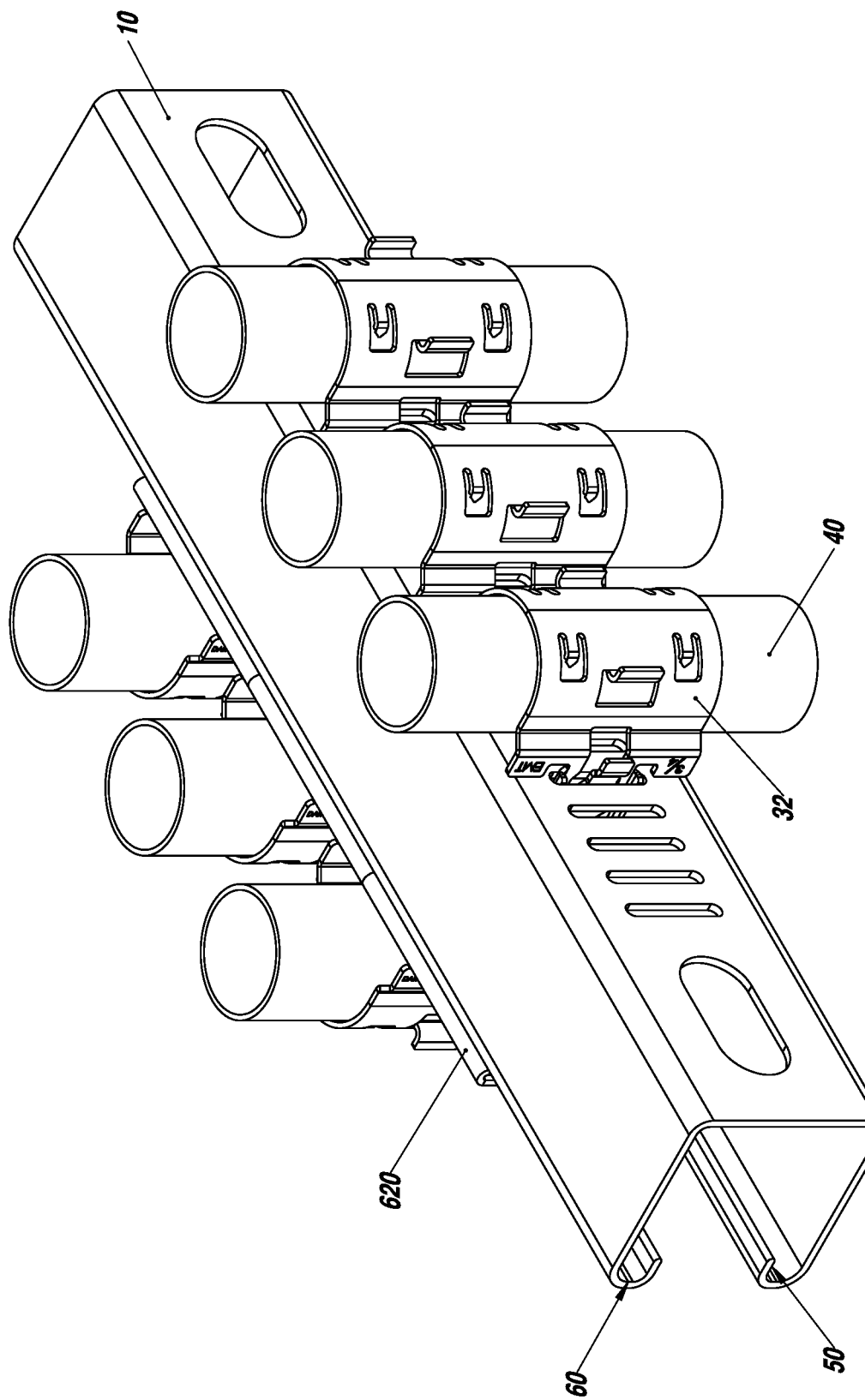
FIG. 5 is another perspective view of a slotted structural member assembly with multiple cages and a strut member according to one embodiment.

As shown in FIGS. 2 and 4 a threaded fastener 220 may be a hanger commonly used in construction and for attachment through hole 54 and secured via nuts 56 to struts 10.

Figure 22:
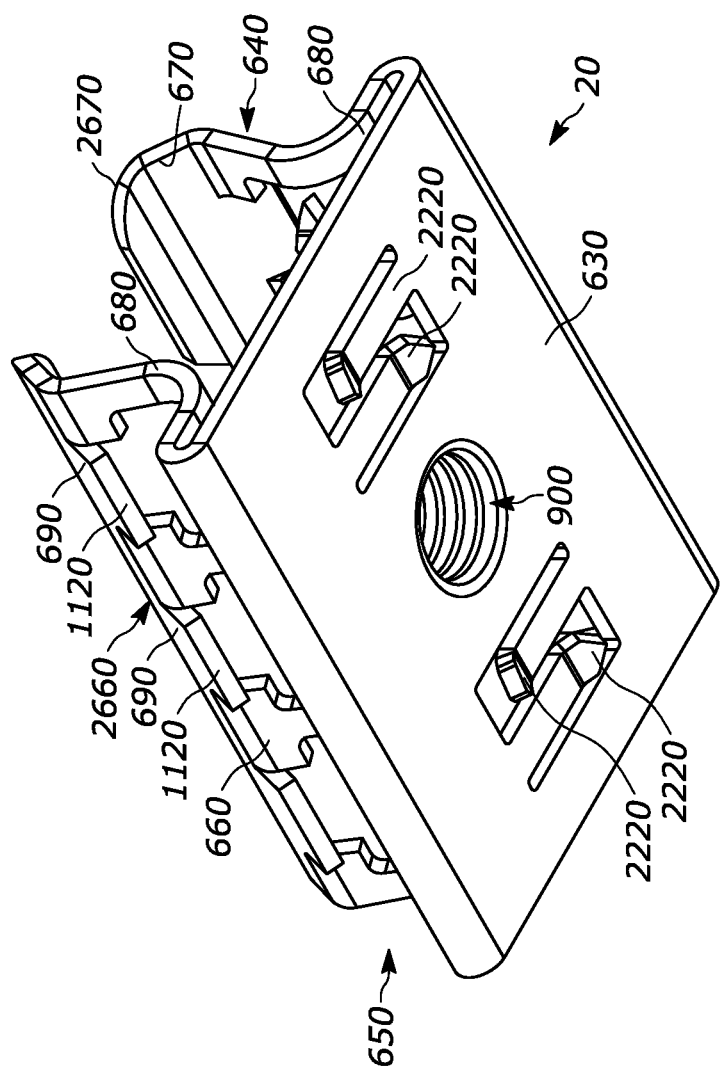
FIGS. 22-23 illustrate perspective views off one embodiment of a bolt receiver wherein the bottom portion 630 has threads.
Figure 23:
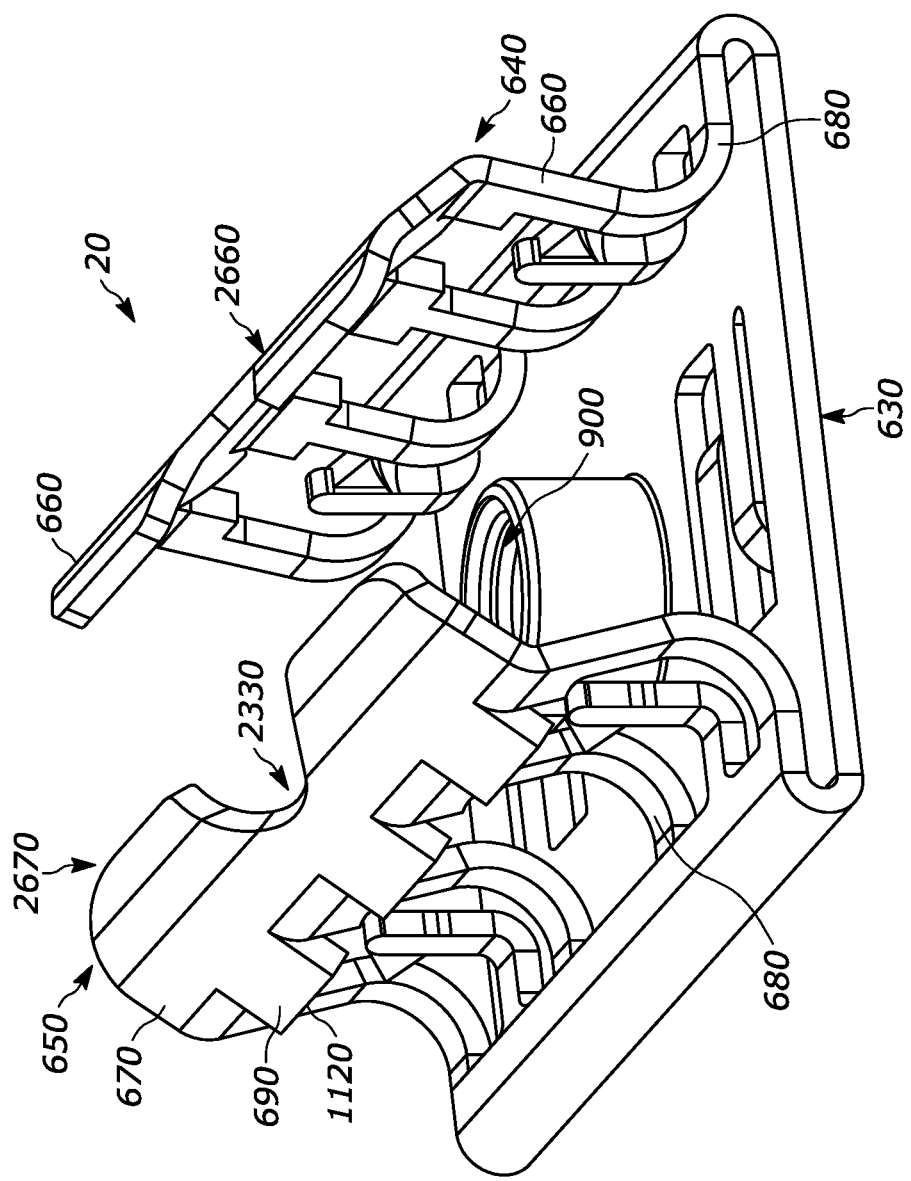
Figure 24:
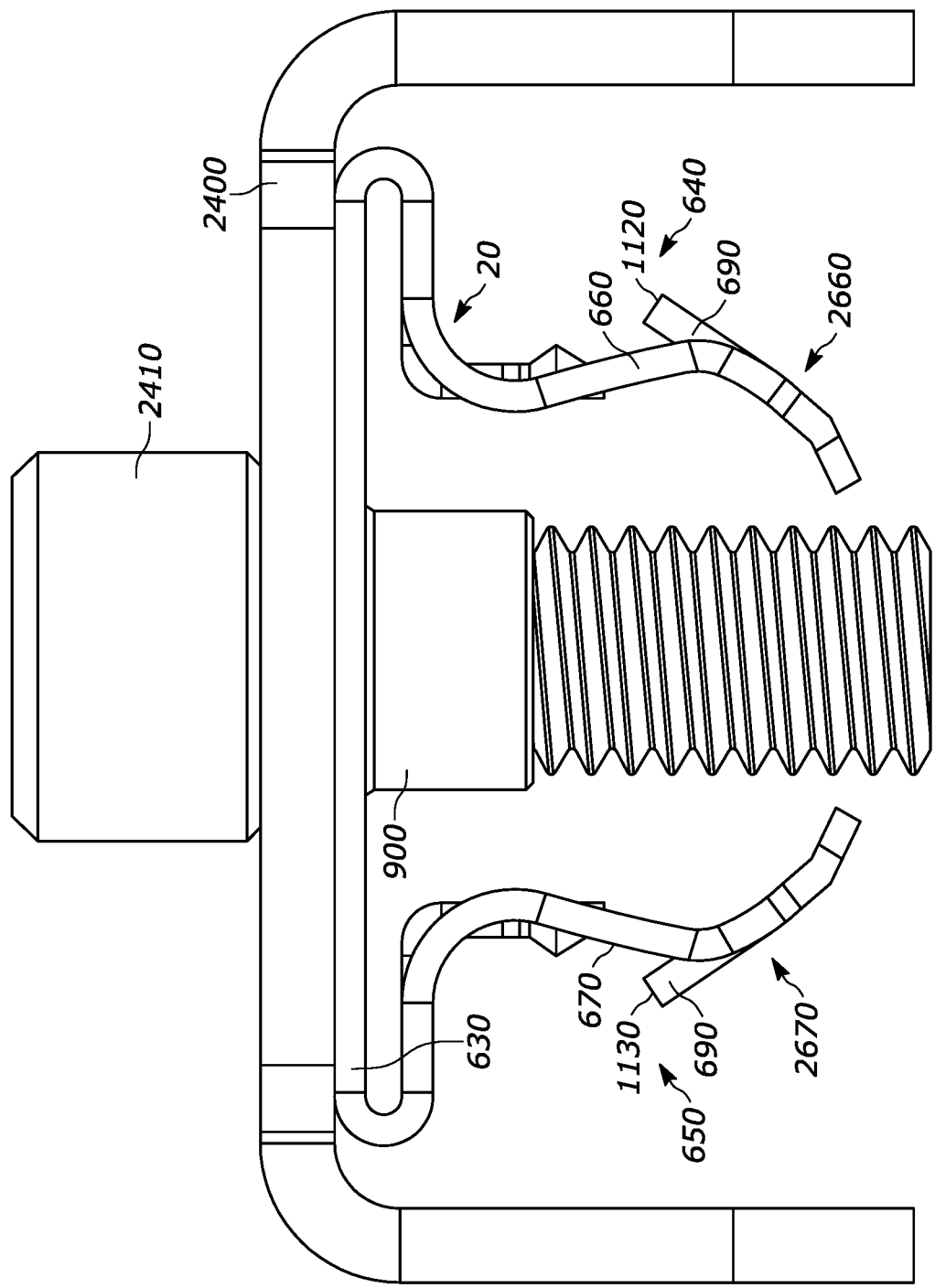
FIG. 24 is a side view of a bolt receiver attached to a receiver.
Figure 25:
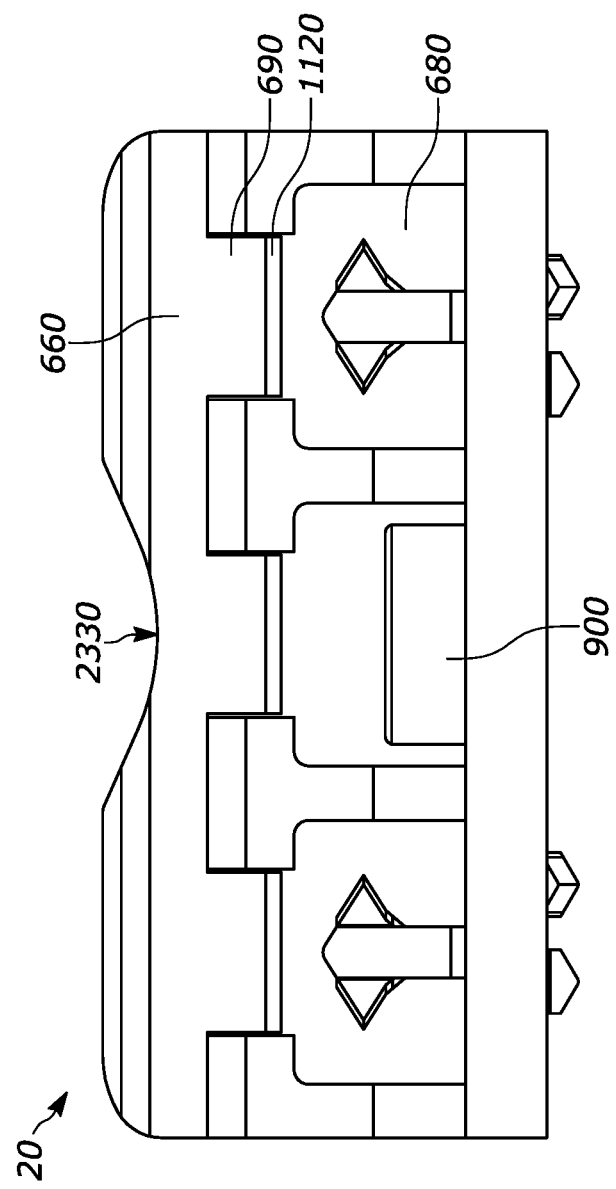
FIG. 25 is a side view of a bolt receiver.
Figure 26:
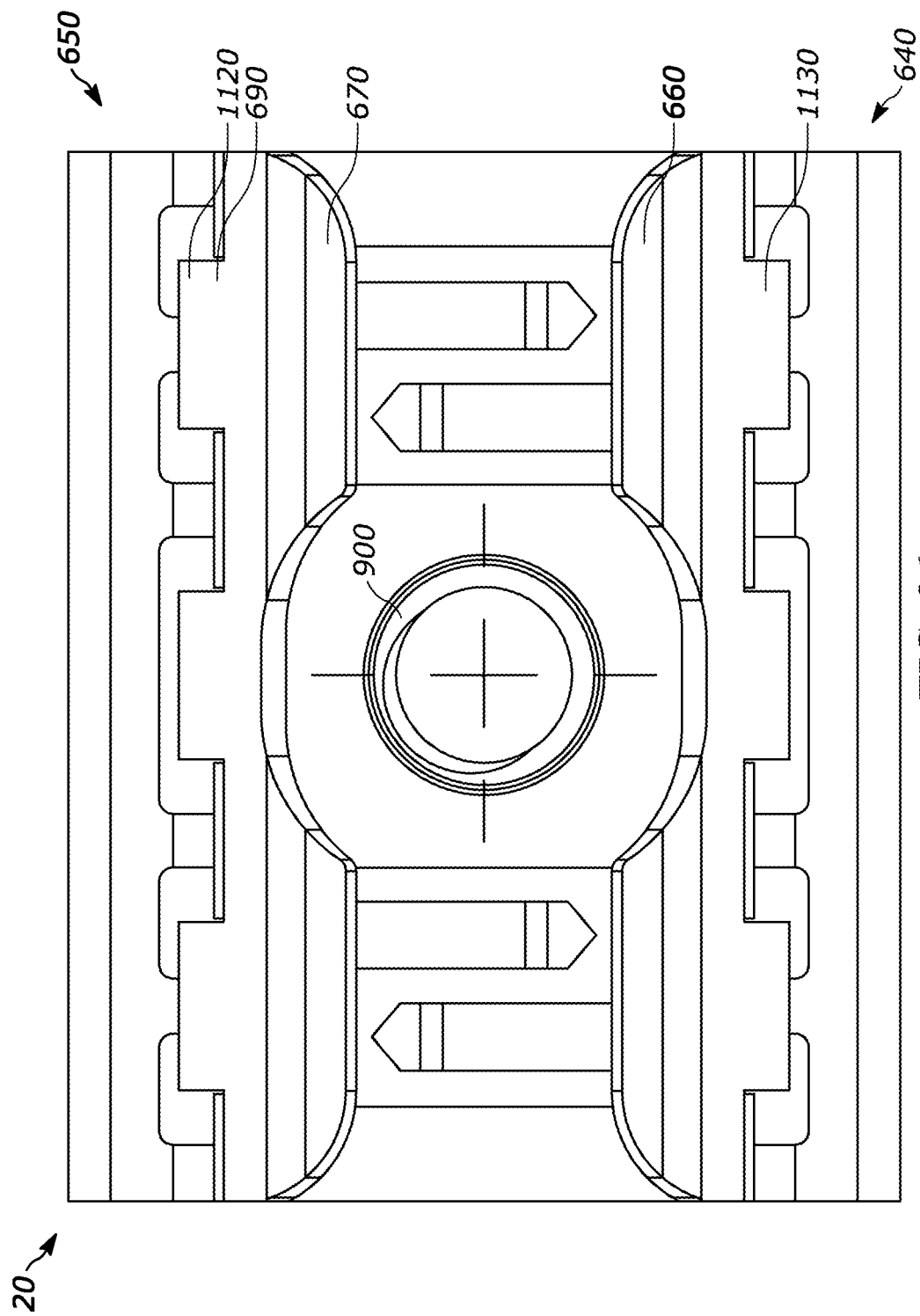
FIG. 26 is a top view of a bolt receiver.
Figure 27:
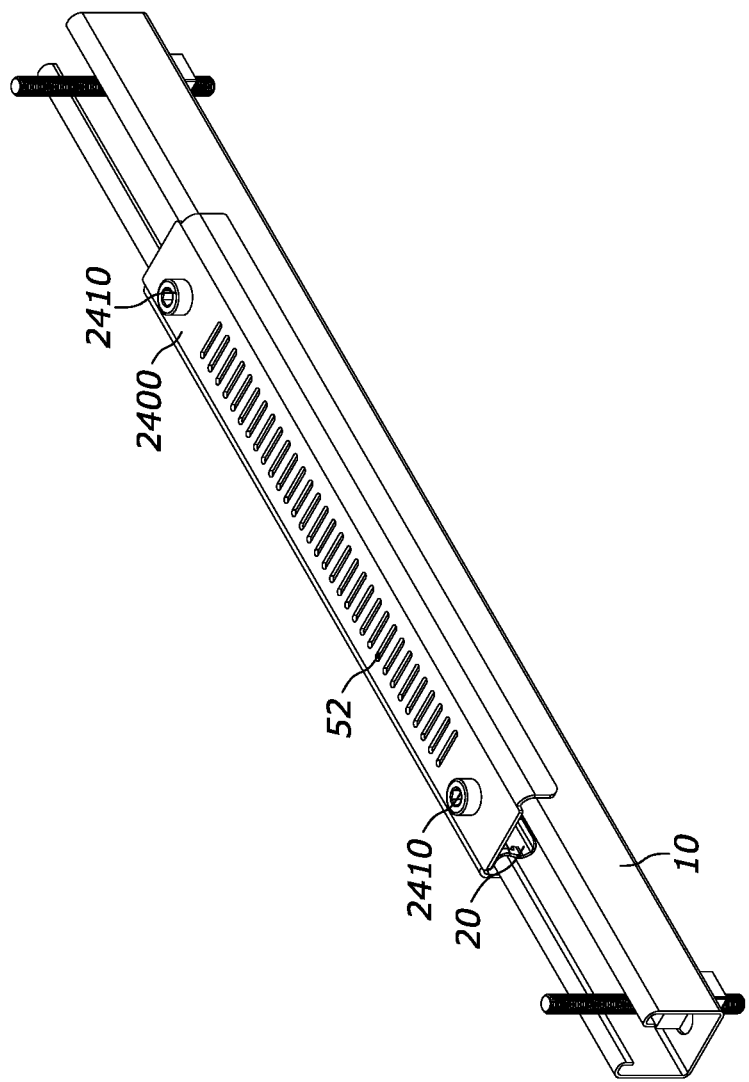
FIG. 27 is a perspective view of a slotted structural member assembly with a receiver, a bolt receiver, a bolt and a strut member.
Figure 28:
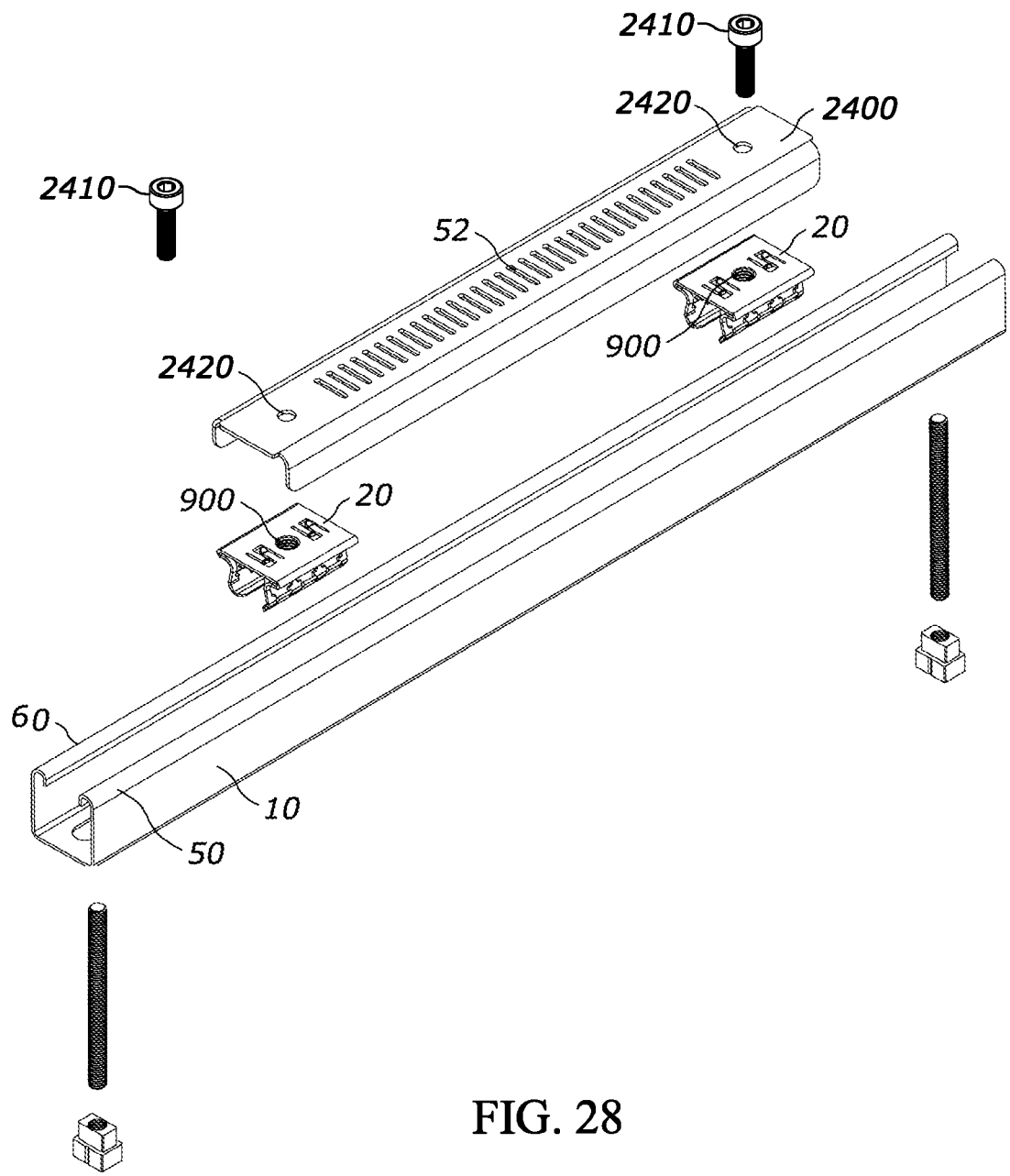
FIG. 28 is an exploded view of a slotted structural member assembly with a receiver, a bolt receiver, a bolt and a strut member.
Figure 29:
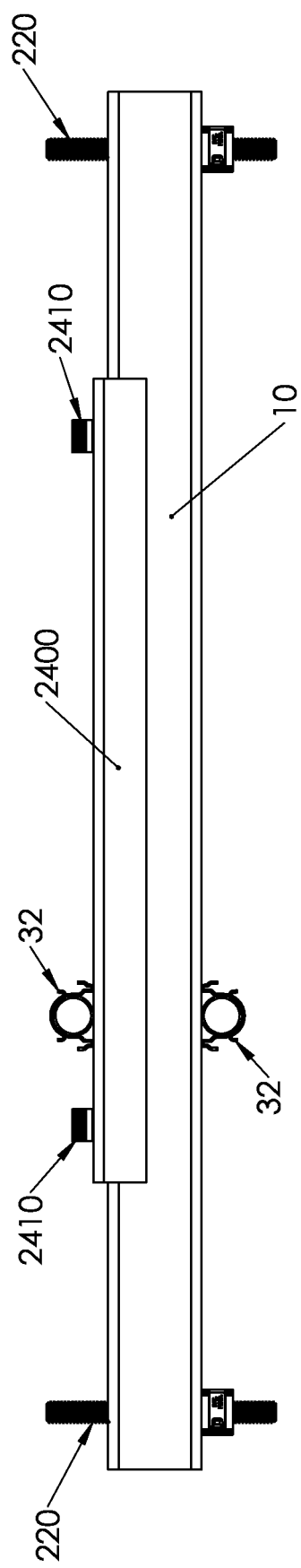
FIG. 29 is a side view of a slotted structural member assembly with a receiver, a bolt receiver, a bolt and a strut member.
Figure 30:
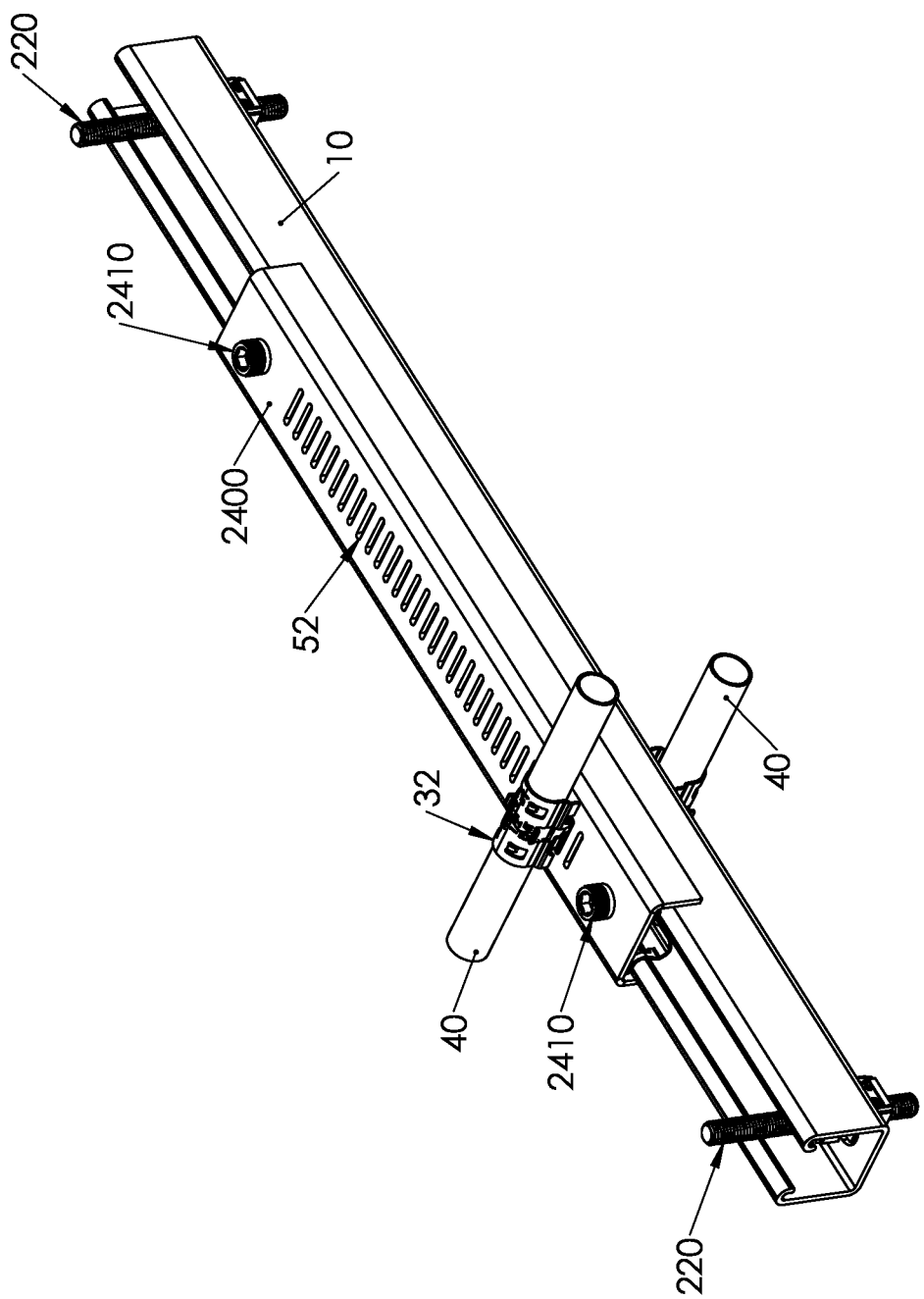
FIG. 30 is a perspective view of a slotted structural member assembly with exemplary bands and pipes.
Figure 31:
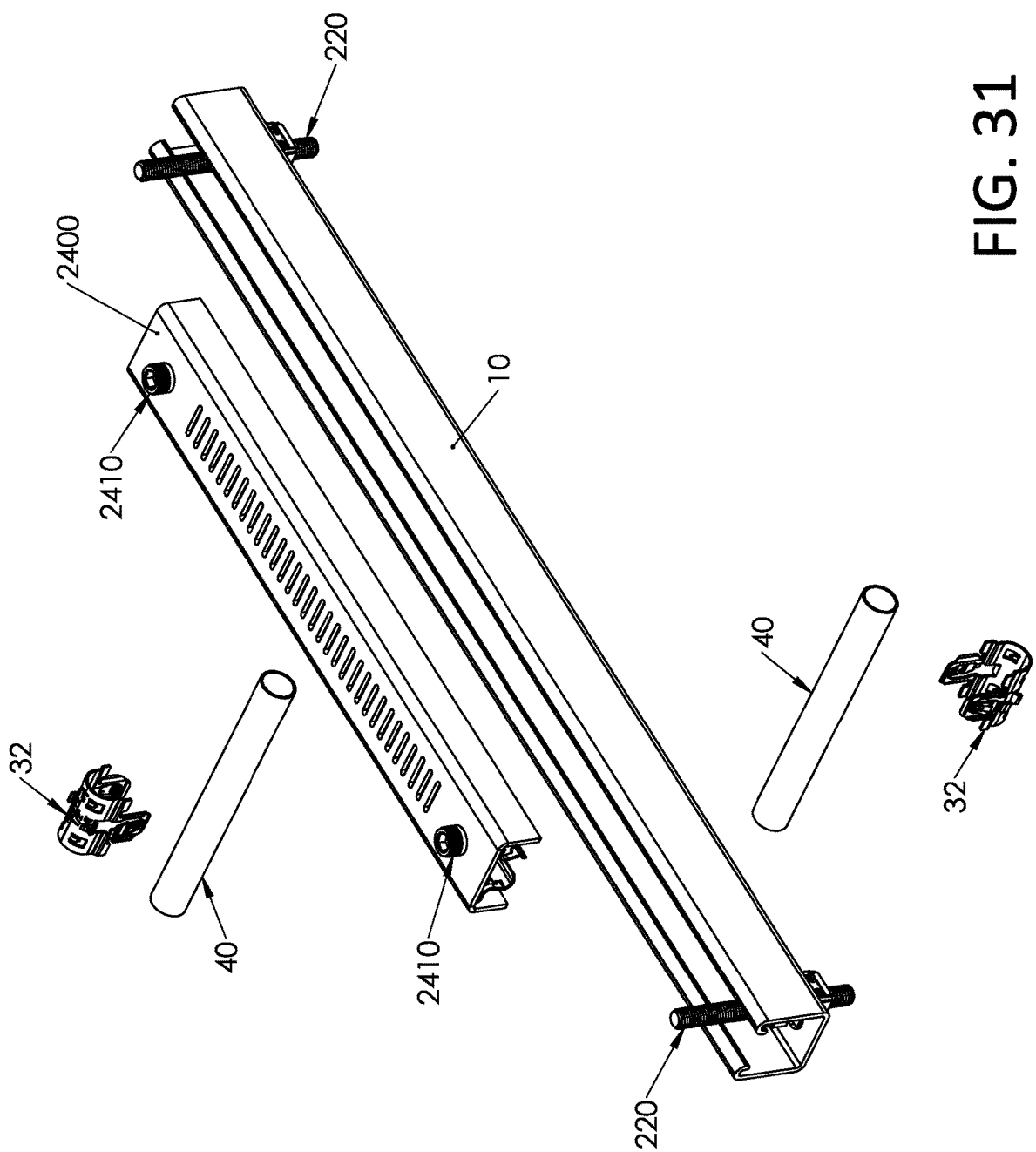
FIG. 31 is an exploded view of a slotted structural member assembly with exemplary bands and pipes.

FIG. 22-23 illustrate one embodiment wherein the bottom portion 630 has threads 900 operable for receiving a threaded fastener 220 such as a screw or rod or any suitable threaded cylinder, not shown. The threads 900 may be drilled, cut or a nut may be welded, cast, forged, or attached to the bottom portion 630 using any suitable attachment means.

FIGS. 6, 22-32 shows a bolt receiver 20 can be easily made with a stamp and die creating a barrel 900 to form an integrated nut according to another embodiment. Barrel 900 may be formed by a deep draw as is known in the art. For example, the bottom area may be punched to form a dome and threads are formed to create a nut.

Among other advantages, the strut receiver 2400, bolt 2410, and bolt receiver 20 is less expensive than a strut receiver with wings. Since the strut receiver 2400 does not require wings that are often stamped, cut or roll formed. As previously described, the wings may be formed along, all, most or just along a portion of the strut receiver 2400. According to one embodiment shown in FIGS. 6, and 22-32, the strut receiver 2400 has no wings, however the strut receiver 2400 has a hole 2420 (see FIG. 28) and may attach to a bolt receiver 20 via bolt 2410. For example, bolt 2410 may be inserted through hole 2420 and threaded into nut 900 and rotated or screwed in to attach bolt receiver 20 to strut receiver 2400. Bolt receiver 20 may attach to strut receiver 2400 alternatively via a clip with arms, wings as described, a clamp, a spring nut, channel nut, weld nut or any other fastener.

As shown in FIG. 22, barbs 2220 provide anti turn or anti rotation when the bolt receiver 20 attaches to strut receiver 2400. Barbs 2220 on bolt receiver 20 thus bite or dig into the inside surface (inside channel) of the bottom portion of strut receiver 2400 when the bolt 2410 is tightened.

As shown in FIG. 23, opening 2330 on wings 660, 670 allows a bolt 3420 to pass through without interfering with the springing action of the springs and corresponding wings.

The bolt receiver 20 then may be easily clipped into the strut 10. The strut receiver 2400 is relatively inexpensive because no wings 660, 670, arms 680 need to be formed, stamped, cut or rolled on the strut receiver 2400. Instead, the bolt receiver 20 clips into the strut 10 as described below. Thus 1, 2, 3, 4 or any suitable number of bolt receivers 20 can clip into a strut 10 and to also bolt to a bolt receiver 20.

Bolt receiver 20 includes a bottom portion, a first side 640 connected to the bottom portion 630 and a second side 650 connected to the bottom portion 630, thereby forming a U-shaped structure with the first 640 and second sides 650. The sides 640, 650 have optional corresponding plurality of first engagement springs 2660, 2670 each have outward facing wings 660, 670. Springs 2660, 2670 may include among other things, arms 680, wings 660, 670, sheer tabs 690 and hooks 1120, 1130.

As shown in FIGS. 6, 22-26, the wings 660 include sheer tabs 690 to snap into a rim 50, 60 and wherein the arms 680 engage a rim 50, 60 edge when in an engage position. The rim 50, 60 has a curled lip at an end opposite the bottom portion 630.

Figure 6:
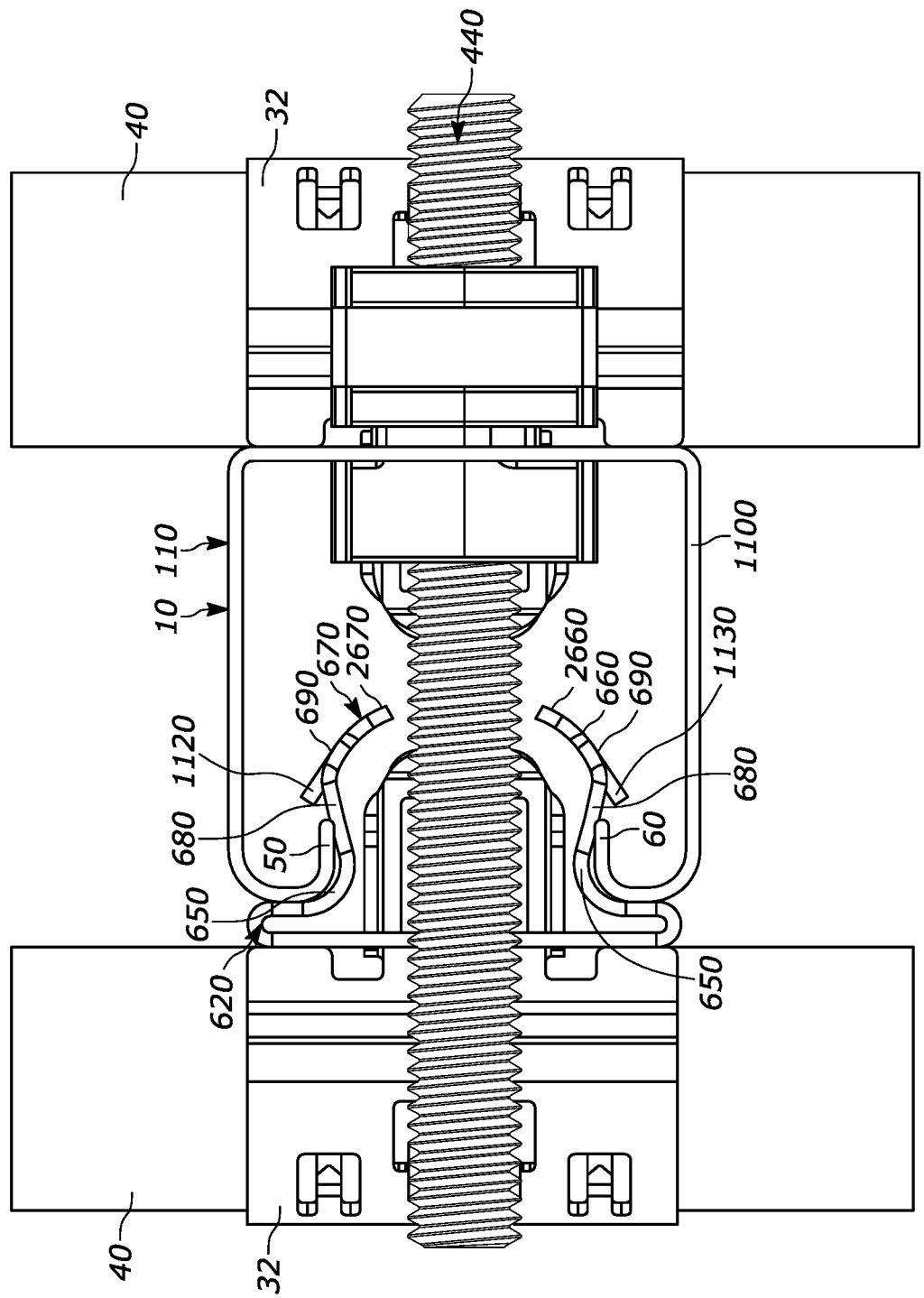
FIG. 6 is an open end view of a slotted structural member assembly according to another embodiment.
Figure 7:
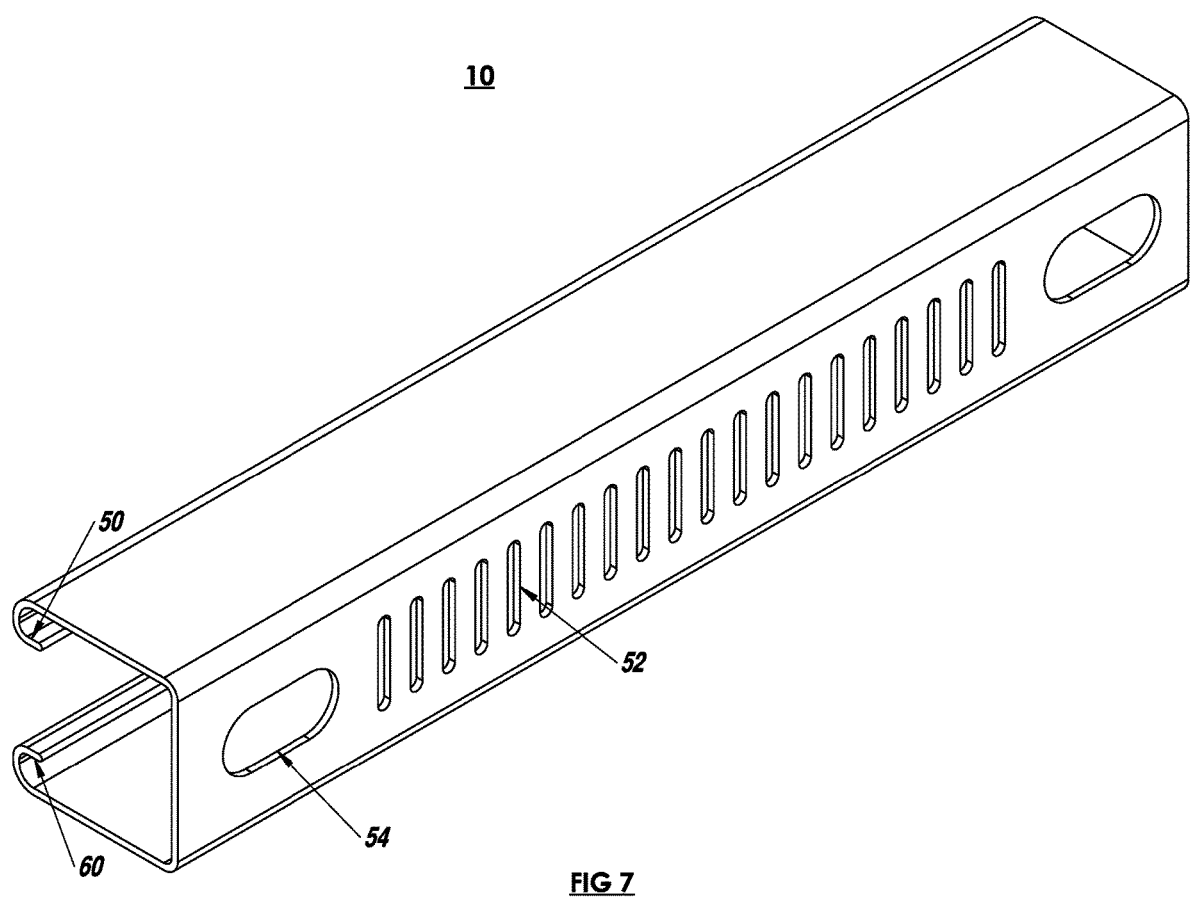
FIG. 7 is a perspective view of a slotted structural member according to another embodiment.
Figure 8:
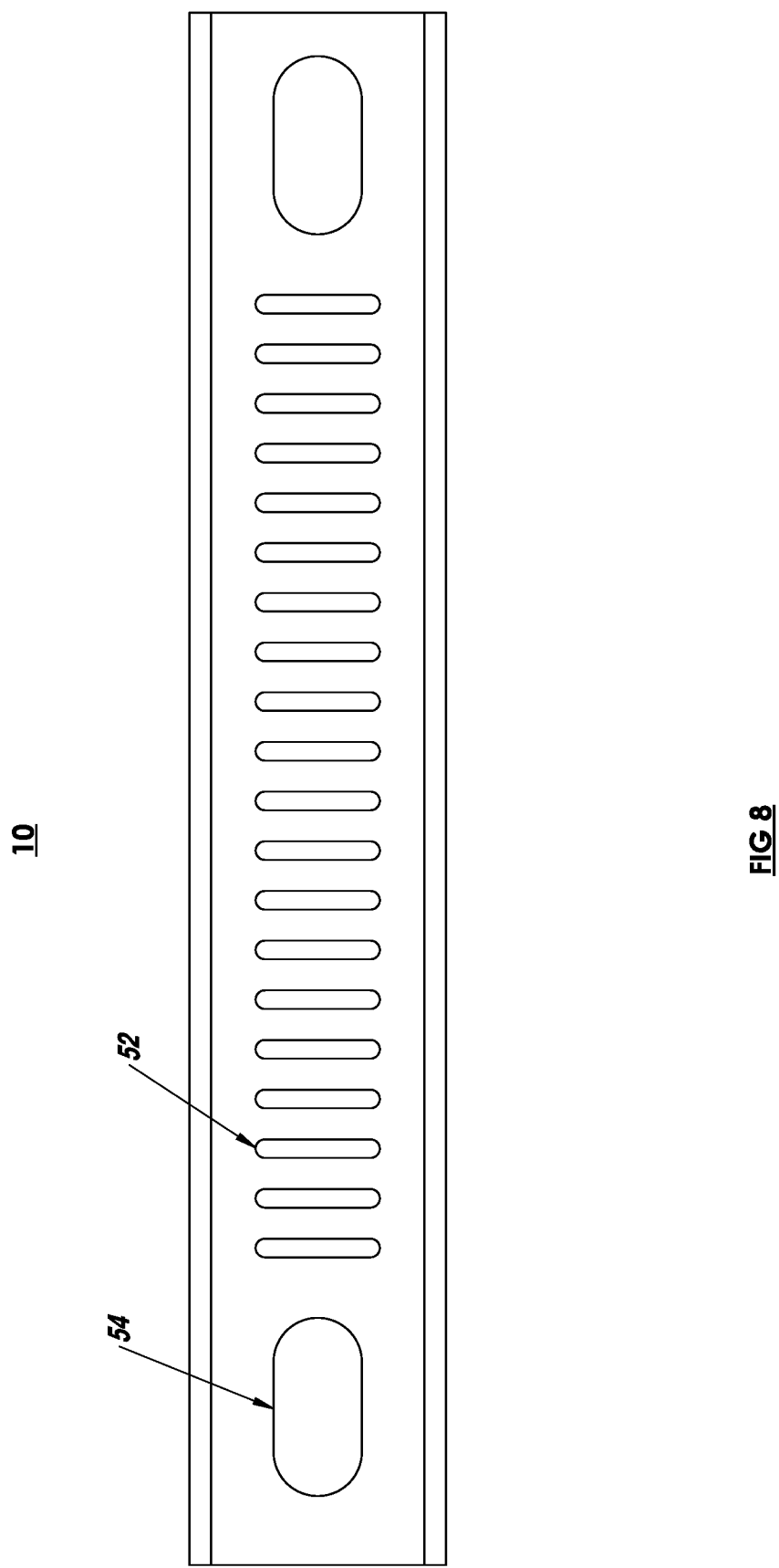
FIG. 8 is a top view of a slotted structural member according to another embodiment.
Figure 9:
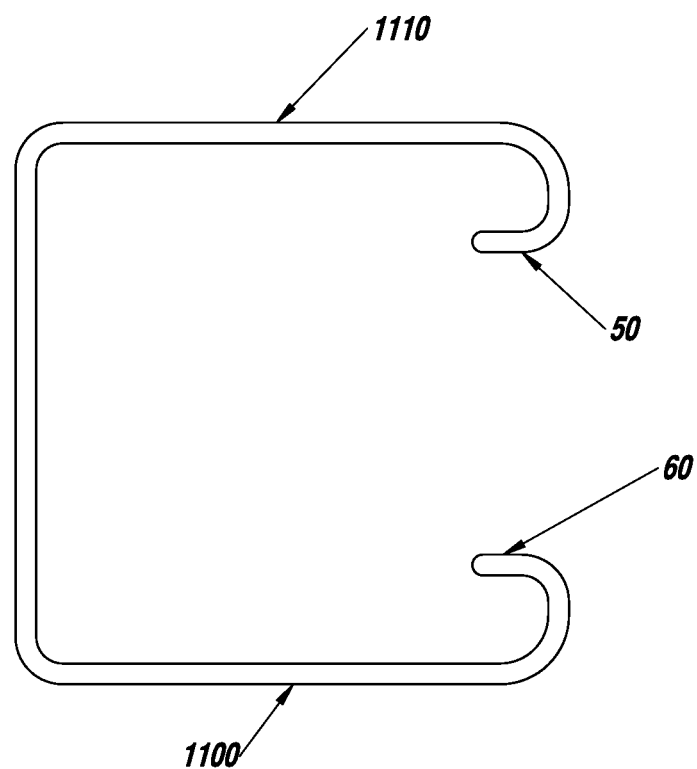
FIG. 9 is an open end view of a slotted structural member according to another embodiment.

As previously described, the wings 660, 670 are operable for springing attachment to rim 50, 60 of the inside channel walls 1100, 1110 of the slotted structural member 10. As shown in FIG. 6 the height of the arms and wings 660, 670 may be chosen according to the wall height of the strut 10 so wings 660, 670 have enough clearance when opposing bands or cages 32 are snapped in. For example as shown in FIG. 6, 28-32, a cage or band 32 is snapped into a receiver 620, the receiver 620 is snapped into a strut 10 and another cage or band 32 is snapped into the strut 10. Thus the height of the strut 10 may set a maximum height of the cage or band 32 and wings 660, 670. Thus if the height of the wall is further reduced then the height of the wings 660, 670 may be reduced accordingly.

According to one embodiment, the wings 660, 670 further comprise a hook 1120, 1130 at an open end of sheet tabs 690 on wing 660, 670 extending into an inside rim or lip 50, 60 on the structural member 10. For example, upon insertion the hook 1120, 1130 snaps over and partially around the rim 50, 60 along with sheer tabs 690 in order to hook and thus impede removal of the receiver 620 from the slotted structural member 10. Thus, three points contact the rim 50, 60: hook 1120, 1130, sheer tabs 690 and arm 680. Arm 680, sheer tab 690 and/or hook 1120, 1130 may include a depression described in U.S. Pat. No. 7,188,392 hereby incorporated by reference. A removal tool such as a screwdriver may be used to pry or bend hooks 1120, 1130 and sheer tabs 690 away from rim 50, 60 or towards each other to facilitate removal.

Figure 32:
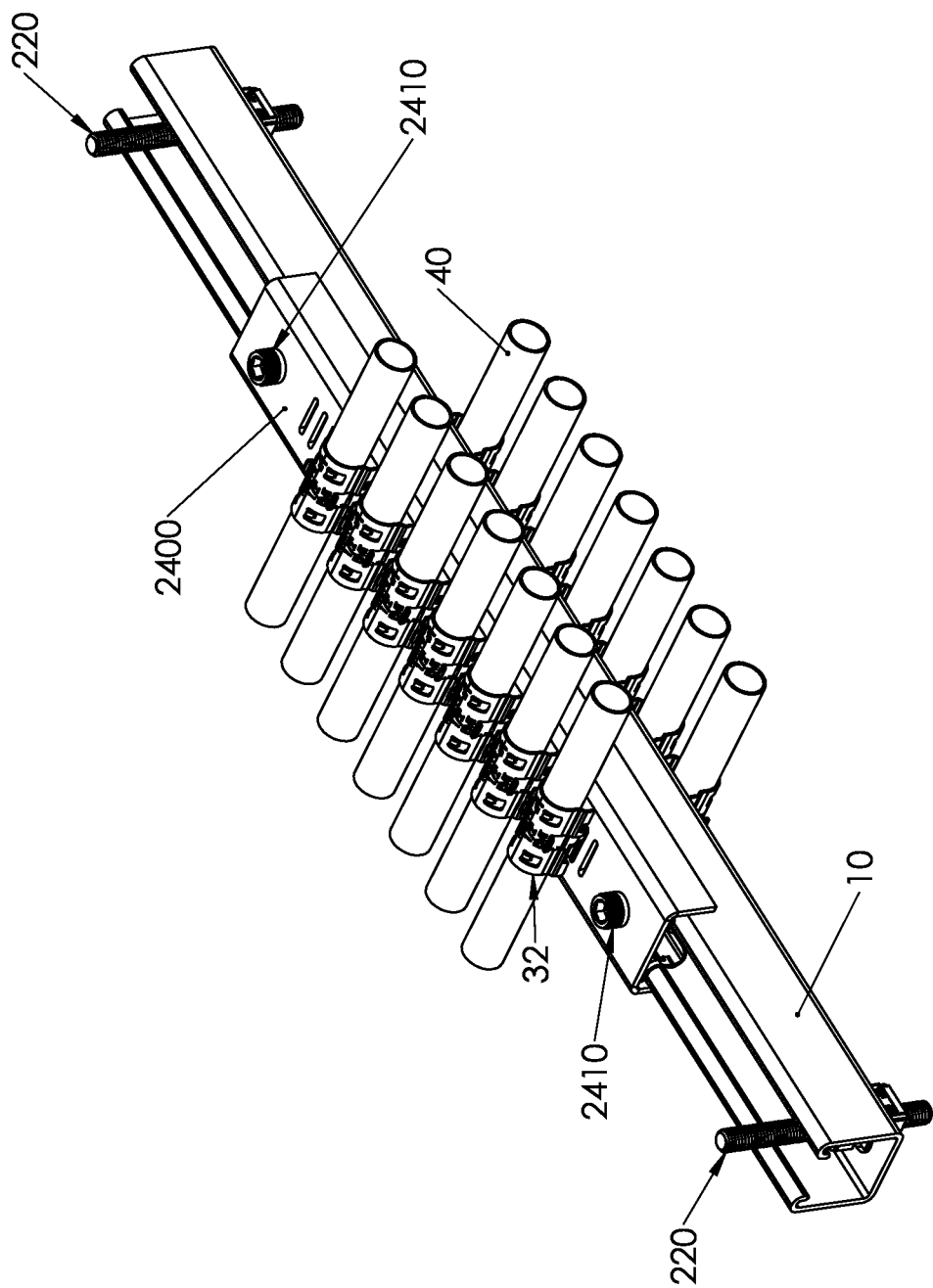
FIG. 32 is another perspective view of a slotted structural member assembly with exemplary bands and pipes.

According to the embodiment shown in FIG. 32, the receiver 2400 and bolt receiver 20 are oriented on a top side of the strut 10. This way the weight of the pipe or conduit 40 push down on and cause the receiver and bolt receiver 20 to be in compression into the strut 10. This optional orientation could accommodate a relatively large number of conduit 40 and thus weight to avoid sagging and unclipping, or shifting left or right. Alternatively, the retention force of the clipping action in the bolt receiver 20 into the strut 10 can be designed or selected to orient the strut such that the receiver 2400 and bolt receiver 20 are oriented downward to accommodate the weight and load of the conduit 40.

What is claimed is:

1. A U-shaped band, strut receiver and bolt receiver assembly to attach a pipe to a structural member comprising:
   a slotted strut receiver to engage the structural member;
   a bolt receiver to engage the slotted strut receiver;
   a U-shaped band comprising;
      a bottom portion,
      a first side having a first arm connected to the bottom portion;
      a second side having a second arm connected to the bottom portion thereby forming a U-shaped structure with the first and second sides; and
   wherein at least one arm includes a wing and snaps into a slot of a plurality of slots on a bottom side of the slotted strut receiver when in an engaged position.

2. A U-shaped band, strut receiver and bolt receiver assembly as in claim 1, wherein the wing on the at least one arm further comprises at least one engagement region to engage the slot of the plurality of slots.

3. A U-shaped band, strut receiver and bolt receiver assembly as in claim 1, wherein the wing on the at least one arm of the U-shaped band snaps into the slotted strut receiver and the slotted strut receiver bolts into the bolt receiver.

4. A U-shaped band, strut receiver and bolt receiver assembly as in claim 3, wherein the wing further comprise a knuckle at an open end of the wing extending into an inside lip on the slot of the slotted strut receiver.

5. A U-shaped band, strut receiver and bolt receiver assembly as in claim 1, wherein the wing has a tapered width to allow the wing to return when snapped into the slot.

6. A U-shaped band, strut receiver and bolt receiver assembly as in claim 1, wherein the bottom portion has a shape selected from at least one of: a semicircular, oval, or conic.

7. A U-shaped band, strut receiver and bolt receiver assembly as in claim 1, further including a stabilizer flange on the at least one arm to engage the slot.

8. A U-shaped band, strut receiver and bolt receiver assembly as in claim 1, further including a driver prong on the bottom portion to assist in snapping the at least one arm into the slot.

9. A U-shaped band, strut receiver and bolt receiver assembly as in claim 1, wherein the slotted strut receiver snaps into the structural member.

10. A U-shaped band, strut receiver and bolt receiver assembly as in claim 1, wherein the structural member is a strut, the strut further comprising:
a bottom portion having a plurality of strut slots, such that at least one arm of another U-shaped band snaps into the strut slot;
a first side connected to the bottom portion;
a second side connected to the bottom portion forming a U-shaped structure with the first and second sides.

11. A slotted structural member assembly comprising:
a strut;
a bottom portion having a plurality of strut slots;
a first side connected to the bottom portion;
a second side connected to the bottom portion, thereby forming a U-shaped structure with the first and second sides;
a band:
a band bottom portion,
a first side having a first arm connected to the band bottom portion;
a second side having a second arm connected to the band bottom portion;
wherein at least one arm snaps into a strut slot of the strut when in an engaged position;
a slotted strut receiver to snap into the strut,
wherein at least one arm of another band snaps into a strut receiver slot on the slotted strut receiver.

12. A slotted structural member assembly of claim 11, wherein the slotted strut receiver has at least one spring for springing attachment to an open end of the strut opposite the bottom portion.

13. A slotted structural member assembly as in claim 11, wherein:
the first arm snaps into a first strut slot; and
a second arm snaps into a second strut slot.

14. A strut receiver assembly for springing attachment to a slotted structural member comprising:
a strut receiver;
a bottom portion having a plurality of receiver slots;
a first side connected to the bottom portion;
a second side connected to the bottom portion, thereby forming a U-shaped structure with the first and second sides;
a bolt receiver:
a plurality of first engagement springs each having an outward facing wing on a first side operable for springing attachment to a first rim on the slotted structural member;
a plurality of second engagement springs each having an outward facing wing on a second side operable for springing attachment to a second rim on the slotted structural member;
wherein the strut receiver bolts to the bolt receiver;
a band comprising:
a band bottom portion,
a first side having a first arm connected to the band bottom portion;
a second side having a second arm connected to the band bottom portion;
wherein at least one arm snaps into a receiver slot when in an engaged position.

15. A strut receiver assembly as in claim 14, wherein:
the first arm snaps into a first receiver slot; and
the second arm snaps into a second receiver slot.

16. A strut receiver assembly as in claim 14, wherein the bolt receiver further includes an outward facing wing on the first engagement springs and further comprises at least one first engagement region to engage the first rim on the slotted structural member and the outward facing wing on the second engagement springs further comprises at least one second engagement region to engage the second rim on the slotted structural member.

17. A strut receiver assembly as in claim 14, wherein the bolt receiver having at least one barb on a bottom portion.

18. A strut receiver assembly as in claim 14, wherein the band bottom portion further comprises at least one tensioner prong to engage a conduit when the band is in an engaged position.

19. A strut receiver assembly as in claim 14 wherein the bolt receiver having a nut on a bottom portion operable to receive a bolt to attach to the strut receiver.

20. A strut receiver assembly as in claim 14, further comprising: a sheer tab and an arm on each wing to engage the rim.

21. A strut receiver assembly as in claim 14, further comprising:
a sheer tab on each wing;
an arm on each wing; and
a hook at an open end of the sheer tab to engage a part of the rim.

* * * * *